United States Patent
Kim et al.

(10) Patent No.: US 11,780,467 B2
(45) Date of Patent: Oct. 10, 2023

(54) METHOD AND APPARATUS FOR CREATING DRIVING ROUTE OF AUTONOMOUS VEHICLE AND COMPUTER PROGRAM THEREFOR

(71) Applicant: RideFlux Inc., Jeju-si (KR)

(72) Inventors: Jiwoong Kim, Jeju-si (KR); Himchan Cho, Hanam-si (KR); Junghee Park, Jeju-si (KR); Ho Yun, Jeju-si (KR); Hawook Jeong, Jeju-si (KR)

(73) Assignee: RideFlux Inc., Jeju-si (KR)

( * ) Notice: Subject to any disclaimer, the term of this patent is extended or adjusted under 35 U.S.C. 154(b) by 134 days.

(21) Appl. No.: 17/534,811

(22) Filed: Nov. 24, 2021

(65) Prior Publication Data
US 2022/0204037 A1     Jun. 30, 2022

(30) Foreign Application Priority Data

Dec. 24, 2020   (KR) ........................ 10-2020-0182744

(51) Int. Cl.
*B60W 60/00*     (2020.01)

(52) U.S. Cl.
CPC .... *B60W 60/0015* (2020.02); *B60W 60/0013* (2020.02); *B60W 2552/00* (2020.02);
(Continued)

(58) Field of Classification Search
CPC ......... B60W 60/0015; B60W 60/0013; B60W 2554/4041; B60W 2552/00; B60W 2556/45; B60W 2720/24
See application file for complete search history.

(56) References Cited

U.S. PATENT DOCUMENTS

2012/0283911 A1   11/2012  Lee et al.
2017/0186322 A1    6/2017  Bonarens et al.
(Continued)

FOREIGN PATENT DOCUMENTS

EP    3629121 A1    4/2020
JP    2013-513149 A 4/2013
(Continued)

OTHER PUBLICATIONS

A Notice of Allowance mailed by the Korean Intellectual Property Office dated Jan. 17, 2023, which corresponds to Korean Patent Application No. 10-2020-0182744 and is related to U.S. Appl. No. 17/534,811.

(Continued)

*Primary Examiner* — Behrang Badii
*Assistant Examiner* — Jay Khandpur
(74) *Attorney, Agent, or Firm* — Studebaker & Brackett PC

(57) ABSTRACT

Provided are a method and apparatus for creating a driving route of an autonomous vehicle and a computer program therefor. A method of creating a driving route of an autonomous vehicle, the method being performed by a computing device, includes obtaining information about a start point and an end point, setting an intermediate point between the start point and the end point, and creating a driving route by connecting the start point, the set intermediate point, and the end point, wherein the driving route includes a set of a curve connecting the start point and the set intermediate point and a curve connecting the set intermediate point and the end point, is expressed by a polynomial function for an angle of movement of the autonomous vehicle, and satisfies one or more continuity conditions related to a curvature.

13 Claims, 13 Drawing Sheets

(52) U.S. Cl.
CPC .............. *B60W 2554/4041* (2020.02); *B60W 2556/45* (2020.02); *B60W 2720/24* (2013.01)

(56) References Cited

U.S. PATENT DOCUMENTS

| | | | | |
|---|---|---|---|---|
| 2020/0003564 | A1* | 1/2020 | Zhang | G01C 21/3602 |
| 2020/0097016 | A1* | 3/2020 | Zhu | G05D 1/0221 |
| 2021/0074037 | A1* | 3/2021 | Zhu | G05D 1/0088 |
| 2021/0188286 | A1* | 6/2021 | Ma | G01C 21/3407 |
| 2022/0161819 | A1* | 5/2022 | Fedeli | B60W 30/14 |
| 2023/0159025 | A1* | 5/2023 | Tummala | G08G 1/0965 |
| | | | | 701/26 |

FOREIGN PATENT DOCUMENTS

| | | | | |
|---|---|---|---|---|
| KR | 10-1704634 | B1 | 2/2017 | |
| KR | 10-2099152 | B1 | 7/2020 | |
| WO | WO-2020139377 | A1 * | 7/2020 | ............ B60W 50/14 |

OTHER PUBLICATIONS

An Office Action mailed by the Korean Intellectual Property Office dated Jul. 13, 2022, which corresponds to Korean Patent Application No. 10-2020-0182744 and is related to U.S. Appl. No. 17/534,811.
The extended European search report issued by the European Patent Office dated May 18, 2022, which corresponds to European Patent Application No. 21210139.8-1009 and is related to U.S. Appl. No. 17/534,811.

\* cited by examiner

FIG. 5

| Type | Order | Boundary conditions |
|---|---|---|
| Two free ends (default) | $p_n = 3$ for all $n$ | $(x_i, y_i, \theta_i, \kappa_i, \kappa_i'' = 0)$<br>$(x_f, y_f, \theta_f, \kappa_f'' = 0)$ |
| One free end and one fixed end with waypoints ($N > 1$) | $p_n = \begin{cases} 5 \\ 3 \end{cases}$, $(n = 0 \wedge \text{diverging}) \vee (n = N-1 \wedge \text{merging})$<br>, otherwise | Diverging<br>$(x_i, y_i, \theta_i, \kappa_i, \kappa_i', \kappa_i'' = 0)$<br>$(x_f, y_f, \theta_f, \kappa_f'' = 0)$<br>Merging<br>$(x_i, y_i, \theta_i, \kappa_i'' = 0)$<br>$(x_f, y_f, \theta_f, \kappa_f, \kappa_f', \kappa_f'')$ |
| Two fixed ends with waypoints ($N > 1$) | $p_n = \begin{cases} 5 \\ 3 \end{cases}$, $n = 0 \vee n = N-1$<br>, otherwise | $(x_i, y_i, \theta_i, \kappa_i, \kappa_i', \kappa_i'')$<br>$(x_f, y_f, \theta_f, \kappa_f, \kappa_f', \kappa_f'')$ |
| One free end and one fixed end without waypoints ($N = 1$) | $p_0 = 5$ | Diverging<br>$(x_i, y_i, \theta_i, \kappa_i, \kappa_i'' = 0)$<br>$(x_f, y_f, \theta_f, \kappa_f'' = 0)$<br>Merging<br>$(x_i, y_i, \theta_i, \kappa_i'' = 0)$<br>$(x_f, y_f, \theta_f, \kappa_f, \kappa_f', \kappa_f'')$ |
| Two fixed ends without waypoints ($N = 1$) | $p_0 = 7$ | $(x_i, y_i, \theta_i, \kappa_i, \kappa_i', \kappa_i'')$<br>$(x_f, y_f, \theta_f, \kappa_f, \kappa_f', \kappa_f'')$ |

FIG. 6

- Smoothness
  - $x_n(s_{f_n}) = x_{n+1}(0)$ for all $n \in \{0, \ldots, N-2\}$
  - $y_n(s_{f_n}) = y_{n+1}(0)$ for all $n \in \{0, \ldots, N-2\}$
  - $\theta_n(s_{f_n}) = \theta_{n+1}(0)$ for all $n \in \{0, \ldots, N-2\}$
  - $\kappa_n(s_{f_n}) = \kappa_{n+1}(0)$ for all $n \in \{0, \ldots, N-2\}$
  - $d\kappa_n(s)/ds|_{s=s_{f_n}} = d\kappa_{n+1}(s)/ds|_{s=0}$ for all $n \in \{0, \ldots, N-2\}$
  - $d^2\kappa_n(s)/ds^2|_{s=s_{f_n}} = d^2\kappa_{n+1}(s)/ds^2|_{s=0}$ for all $n \in \{0, \ldots, N-2\}$
- Waypoints
  - $x_{n-1}(s_{f_{n-1}}) = x_n^w$ for all $n \in \{1, \ldots, N-1\}$
  - $y_{n-1}(s_{f_{n-1}}) = y_n^w$ for all $n \in \{1, \ldots, N-1\}$
- Boundary conditions
  - $x_0(0) = x_i$
  - $y_0(0) = y_i$
  - $\theta_0^0 = \theta_i$
  - $\kappa_0(0) = \kappa_i$ if the head end is a fixed end
  - $\kappa_0'(0) = \kappa_i'$ if the head end is a fixed end
  - $\kappa_0''(0) = \kappa_i''$ (which is set to zero when the head end is a free end)
  - $x_{N-1}(s_{f_{N-1}}) = x_f$
  - $y_{N-1}(s_{f_{N-1}}) = y_f$
  - $\theta_{N-1}(s_{f_{N-1}}) = \theta_f$
  - $\kappa_{N-1}(s_{f_{N-1}}) = \kappa_f$ if the tail end is a fixed end
  - $\kappa_{N-1}'(s_{f_{N-1}}) = \kappa_f'$ if the tail end is a fixed end
  - $\kappa_{N-1}''(s_{f_{N-1}}) = \kappa_f''$ (which is set to zero when the tail end is a free end)

METHOD AND APPARATUS FOR CREATING DRIVING ROUTE OF AUTONOMOUS VEHICLE AND COMPUTER PROGRAM THEREFOR

CROSS-REFERENCE TO RELATED APPLICATION

This application claims priority to and the benefit of Korean Patent Application No. 10-2020-0182744, filed on Dec. 24, 2020, the disclosure of which is incorporated herein by reference in its entirety.

BACKGROUND

1. Field of the Invention

Various embodiments of the present disclosure relate to a method and apparatus for creating a driving route of an autonomous vehicle and a computer program therefor.

2. Discussion of Related Art

There is a trend of equipping vehicles with various types of sensors and electronic devices (e.g., advanced driver assistance system (ADAS)) for convenience of users who drive vehicles, and particularly, technologies for an autonomous driving system for vehicles are being actively developed.

Here, the autonomous driving system refers to a system capable of identifying surroundings without a driver's intervention and allowing a vehicle to be automatically driven to a given destination according to the identified surroundings.

In an autonomous driving system of the related art, in order to allow an autonomous vehicle to drive from a start point to an end point, a driving route from the start point to the end point is created based on map data and the autonomous vehicle is controlled to travel along the driving route.

However, because the autonomous driving system of the related art creates the driving route by simply connecting the start point and the end point, mechanical characteristics of the autonomous vehicle traveling along the driving route cannot be taken into consideration and thus the autonomous vehicle may rush to change a direction or travel uncomfortably.

SUMMARY OF THE INVENTION

The present disclosure is directed to a method and apparatus for creating a driving route of an autonomous vehicle by setting one or more intermediate points between a start point and an end point and connecting the start point, the one or more intermediate points, and the end point, wherein the start point, the one or more intermediate points, and the end point are connected by taking into consideration an angle of movement and a steering angle (an angle of a steering wheel) of the autonomous vehicle to allow the autonomous vehicle to smoothly travel along the driving route without causing the sense of difference, and a computer program therefor.

Aspects of the present disclosure are not limited thereto and other aspects not described herein will be apparent to those of ordinary skill in the art from the following description.

An aspect of the present disclosure provides a method of creating a driving route of an autonomous vehicle, the method being performed by a computing device, the method including obtaining information about a start point and an end point, setting an intermediate point between the start point and the end point, and creating a driving route by connecting the start point, the set intermediate point, and the end point, wherein the driving route includes a set of a curve connecting the start point and the set intermediate point and a curve connecting the set intermediate point and the end point, is expressed by a polynomial function for an angle of movement of the autonomous vehicle, and satisfies one or more continuity conditions related to a curvature.

In various embodiments, the set intermediate point may include a first intermediate point and a second intermediate point, and the creating of the driving route may include estimating a first polynomial function corresponding to a first unit driving route connecting the start point and the first intermediate point, estimating a second polynomial function corresponding to a second unit driving route connecting the first intermediate point and the second intermediate point, estimating a third polynomial function corresponding to a third unit driving route connecting the second intermediate point and the end point, deciding the estimated first polynomial function, the estimated second polynomial function, and the estimated third polynomial function using the information about the start point, the set intermediate point, and the end point and the one or more continuity conditions related to the curvature, and creating a final driving route of the autonomous vehicle by connecting the decided first polynomial function, the decided second polynomial function, and the decided third polynomial function.

In various embodiments, the estimating of the first polynomial function corresponding to the first unit driving route may include setting boundary conditions for the start point and the end point and estimating the first polynomial function connecting the start point and the first intermediate point, wherein an order of the estimated first polynomial function may be determined based on the number of the set boundary conditions.

In various embodiments, the estimating of the first polynomial function corresponding to the first unit driving route may include estimating the first polynomial function connecting the start point and the first intermediate point, determining a type and number of boundary conditions for the start point and the end point to be set on the basis of an order of the estimated first polynomial function; and setting the boundary conditions on the basis of the type and number of the determined boundary conditions.

In various embodiments, the estimating of the second polynomial function corresponding to the second unit driving route may include receiving a smoothness of the driving route of the autonomous vehicle, setting one or more continuity conditions for the curvature on the basis of the received smoothness of the driving route, and estimating the second polynomial function connecting the first intermediate point and the second intermediate point, wherein an order of the estimated second polynomial function may be determined based on the one or more continuity conditions for the curvature.

In various embodiments, the estimating of the third polynomial function corresponding to the third unit driving route may include setting boundary conditions for the start point and the end point and estimating the third polynomial function connecting the second intermediate point and the end point, wherein an order of the estimated third polynomial function may be determined based on the number of the set boundary conditions.

In various embodiments, the estimating of the third polynomial function corresponding to the third unit driving route may include estimating a third polynomial function connecting the second intermediate point and the end point, determining a type and number of boundary conditions for the start point and the end point to be set on the basis of an order of the estimated third polynomial function, and setting the boundary conditions on the basis of the type and number of the determined boundary conditions.

In various embodiments, the creating of the driving route may include determining an order of a polynomial function for the created driving route to be 4 when the one or more continuity conditions for the curvature indicate a second continuous derivative of the curvature.

In various embodiments, the method may further include resetting one or more intermediate points between the end point and a position of the autonomous vehicle at a point in time when the driving route change is requested when the autonomous vehicle traveling along a first driving route is requested to perform a driving route change, extracting data about the position of the autonomous vehicle at the point in time when the driving route change is requested from a polynomial function for the first driving rout, and creating a second driving route connecting the position of the autonomous vehicle at the point in time when the driving route change is requested, the reset one or more intermediate points, and the end point on the basis of the extracted data and coordinates of the reset one or more intermediate points.

In various embodiments, the method may further include resetting one or more intermediate points between a start point and an end point of the avoidance route, which are located on the created driving route when an event occurs on the created driving route, the autonomous vehicle traveling along the created driving route is requested to create an avoidance route with respect to the event, extracting data about the start point and the end point of the avoidance route from the polynomial function for the created driving route, and creating the avoidance route connecting the start point of the avoidance route, the reset one or more intermediate points, and the end point of the avoidance route using the extracted data and coordinates of the reset one or more intermediate points.

In various embodiments, the method may further include providing a user interface (UI) configured to output map data of a region, and the obtaining of the information about the start point and the end point may include receiving two-dimensional (2D) coordinates of the start point and the end point and angles of movement of the autonomous vehicle at the start point and the end point through the UI, the setting of the intermediate point may include receiving 2D coordinates of one or more intermediate points between the start point and the end point through the UI, and the creating of the driving route may include creating the driving route connecting the start point, the one or more intermediate points, and the end point received through the UI, and automatically updating the created driving route to include a new intermediate point when the new intermediate point is additionally received through the UI, and displaying the created driving route on map data output through the UI.

In various embodiments, the method may further include obtaining map data about the region including the start point and the end, and the setting of the intermediate point may include analyzing the map data about the region to identify lanes of a road connecting the start point and the end point and selecting one or more intermediate points between the start point and the end point on the basis of a result of identifying the lanes of the road.

Another aspect of the present disclosure includes an apparatus for creating a driving route of an autonomous vehicle, the apparatus including a processor, a network interface, a memory, and a computer program loaded in the memory and executed by the processor, wherein the computer program may include an instruction configured to obtain information about a start point and an end point, an instruction configured to set an intermediate point between the start point and the end point, and an instruction configured to create a driving route connecting the start point, the intermediate point, and the end point, wherein the driving route includes a set of a curve connecting the start point and the intermediate point and a curve connecting the intermediate point and the end point, is expressed using a polynomial function for an angle of movement of the autonomous vehicle, and satisfies one or more continuity conditions related to a curvature.

Another aspect of the present disclosure includes a computer program recorded on a computer-readable recording medium, which is executed to perform, when combined with a computing device: obtaining information about a start point and an end point, setting an intermediate point between the start point and the end point, and creating a driving route connecting the start point, the intermediate point, and the end point, wherein the created driving route includes a set of a curve connecting the start point and the set intermediate point and a curve connecting the set intermediate point and the end point, is expressed using a polynomial function for an angle of movement of the autonomous vehicle, and satisfies one or more continuity conditions for a curvature.

Other details of the present disclosure are provided in the detailed description and drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 5 is a table showing the number and types of boundary conditions according to types of a start point and an end point and an order of a polynomial function therefor, which are applicable to various embodiments;

FIG. 6 illustrates a list of conditions that should be satisfied for a polynomial function to calculate parameters according to various embodiments;

DETAILED DESCRIPTION OF EXEMPLARY EMBODIMENTS

Figure 1:
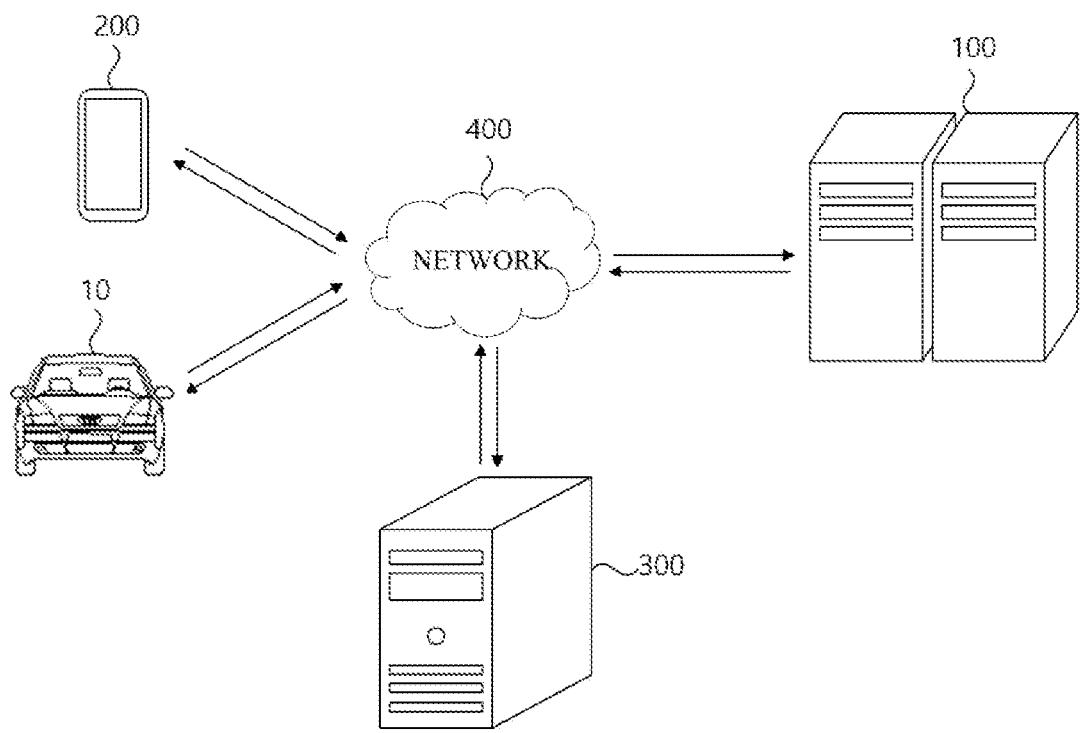
FIG. 1 is a diagram illustrating a system for creating a driving route of an autonomous vehicle according to an embodiment of the present disclosure.

Advantages and features of the present disclosure and methods of achieving them will be apparent from embodiments described in detail, in conjunction with the accompanying drawings. However, the present disclosure is not limited to embodiments set forth herein and may be embodied in many different forms. The embodiments are merely provided so that this disclosure will be thorough and complete and will fully convey the scope of the disclosure to those of ordinary skill in the art. The present disclosure should be defined by the claims.

The terms used herein are for the purpose of describing embodiments only and are not intended to be limiting of the present disclosure. As used herein, singular forms are intended to include plural forms unless the context clearly indicates otherwise. As used herein, the terms "comprise" and/or "comprising" specify the presence of stated components but do not preclude the presence or addition of one or more other components. Throughout the disclosure, like reference numerals refer to like elements, and "and/or" includes each and all combinations of one or more of the mentioned components. Although "first," "second," etc. are used to describe various components, these components are not limited by these terms. These terms are only used to distinguish one component from another. Therefore, a first component discussed below could be termed a second component without departing from the technical scope of the present disclosure.

Unless otherwise defined, all terms (including technical and scientific terms) used herein have the same meaning as commonly understood by one of ordinary skill in the art to the present disclosure pertains. Terms, such as those defined in commonly used dictionaries, will not be interpreted in an idealized or overly formal sense unless expressly so defined herein.

The term "unit" or "module" used herein should be understood as software or a hardware component, such as a FPGA or an ASIC, which performs certain functions. However, the term "unit" or "module" is not limited to software or hardware. The term "unit" or "module" may be configured to be stored in an addressable storage medium or to reproduce one or more processors. Thus, the term "unit" or "module" should be understood to include, for example, components, such as software components, object-oriented software components, class components, and task components, processes, functions, attributes, procedures, subroutines, segments of program code, drivers, firmware, microcode, a circuit, data, databases, data structures, tables, arrays, and parameters. Functions provided in components and "units" or "modules" may be combined into smaller numbers of components and "units" or "modules" or divided into subcomponents and "subunits" or "submodules."

Spatially relative terms, such as "below," "beneath," "lower," "above," "upper," and the like, may be used herein for ease of description of the relationship between one element and other elements as illustrated in the drawings. Spatially relative terms are intended to encompass different orientations of components in use or operation in addition to the orientations depicted in the drawings. For example, when one component illustrated in each of the drawings is turned upside down, another component referred to as "below" or "beneath" the component may be located "above" the component. Thus, the illustrative term "below" should be understood to encompass both an upward direction and a downward direction. Components can be oriented in different directions as well, and thus spatially relative terms can be interpreted according to orientation.

In the present specification, the term "computer" refers to all types of hardware devices each including at least one processor and may be understood to include a software configuration operated in a hardware device according to an embodiment. For example, a computer may be understood to include, but is not limited to, a smartphone, a tablet personal computer (PC), a desktop computer, a notebook computer, and a user client and an application running in each device.

Hereinafter, embodiments of the present disclosure will be described in detail with reference to the accompanying drawings.

Operations described herein will be described as being performed by a computer, but a subject of each of the operations is not limited thereto and at least some of the operations may be performed by different devices according to an embodiment.

FIG. 1 is a diagram illustrating a system for creating a driving route of an autonomous vehicle according to an embodiment of the present disclosure.

Referring to FIG. 1, the system for creating a driving route of an autonomous vehicle according to the embodiment of the present disclosure may include a driving route creating apparatus 100, a user terminal 200, and an external server 300.

Here, the system for creating a driving route of an autonomous vehicle shown in FIG. 1 is merely an example. Therefore, components thereof are not limited to those shown in the embodiment of FIG. 1, and other components may be added thereto or some of the components may be modified or omitted.

In an embodiment, the driving route creating apparatus 100 is capable of creating a driving route for controlling driving of an autonomous vehicle. For example, the driving route creating apparatus 100 may be connected to the user terminal 200 through a network 400, and create and provide a driving route connecting a start point and an end point that are input from the user terminal 200.

Figure 9:
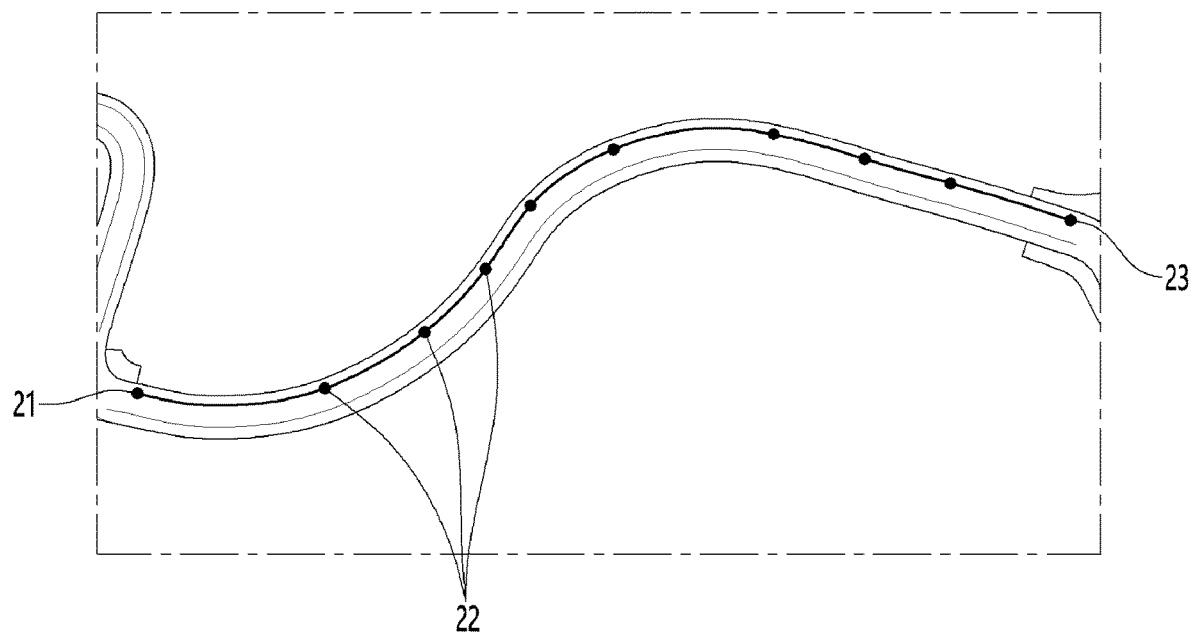
FIGS. 9 to 11 are diagrams illustrating a form in which a driving route connecting a start point, one or more intermediate points, and an end point is displayed on a map according to various embodiments.
Figure 10:
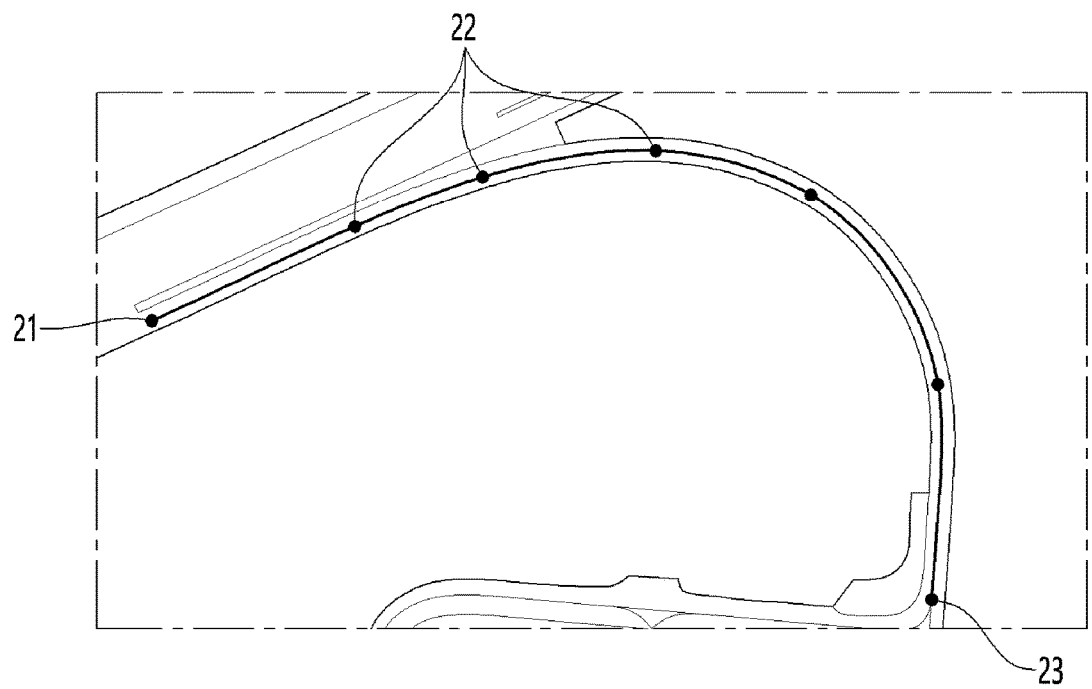
Figure 11:
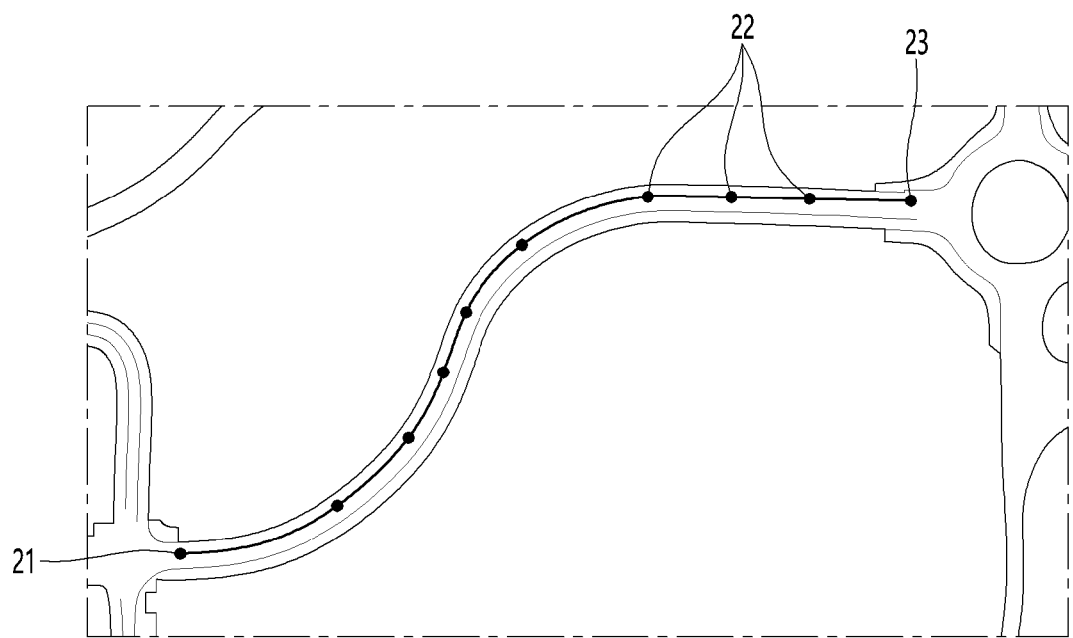

In various embodiments, the driving route creating apparatus 100 may provide an application for creating and providing a driving route of the autonomous vehicle 10, provide a user interface for creating a driving route when the provided application is executed, and create a driving route through the UI or provide map data displaying the created driving route (e.g., map data shown in FIG. 9, 10, or 11).

In various embodiments, the driving route creating apparatus 100 may be connected to a control module (not shown) or a control system for controlling an operation of the autonomous vehicle 10 and create a driving route connecting a start point and an end point and provide the driving route to the control module or the control system when the control module or the control system controls the autonomous vehicle 10 to travel along a predetermined driving route.

Here, although it is described above that the control module or the control system for controlling the operation of the autonomous vehicle 10 is provided separately outside the driving route creating apparatus 100, the above description is only an example and the present disclosure is not limited thereto, and the driving route creating apparatus 100 may be a control system for controlling an operation of the autonomous vehicle 10, and creating a driving route may be a part of a function of controlling an autonomous vehicle to travel along a predetermined driving route.

In an embodiment, the user terminal 200 may be connected to the driving route creating apparatus 100 through the network 400, provide the driving route creating apparatus 100 with information about a start point, an end point, and an intermediate point between the start point and the end point, which are necessary to create a driving route, and be provided with a driving route connecting the start point, the intermediate point, and the end point as a response to the provided information.

In various embodiments, a smoothness, i.e., a level of smoothness (gentleness), of a preferred driving route may be input to the user terminal 200 to be provided with the driving route in which the level of smoothness is reflected.

In various embodiments, the user terminal 200 may include an operating system capable of executing an application, include a smartphone with a display and an infotainment system of a vehicle in at least a part thereof, and output a UI for generating and receiving a driving route when an application provided from the driving route creating apparatus 100 is downloaded, installed and executed therein.

In an embodiment, the external server 300 may be connected to the driving route creating apparatus 100 through the network 400 and may store and manage various types of data, information, and software (e.g., map data, a driving route creation algorithm, etc.) necessary for the driving route creating apparatus 100 to provide a method of creating a driving route of an autonomous vehicle.

In addition, the external server 300 may receive and store various types of data and information (e.g., driving route data, image analysis result data, etc.) generated as the driving route creating apparatus 100 provides the method of creating a driving route of an autonomous vehicle. For example, the external server 300 may be a storage server provided separately outside the driving route creating apparatus 100 but is not limited thereto. A hardware configuration of the driving route creating apparatus 100 will be described with reference to FIG. 2 below.

Figure 2:
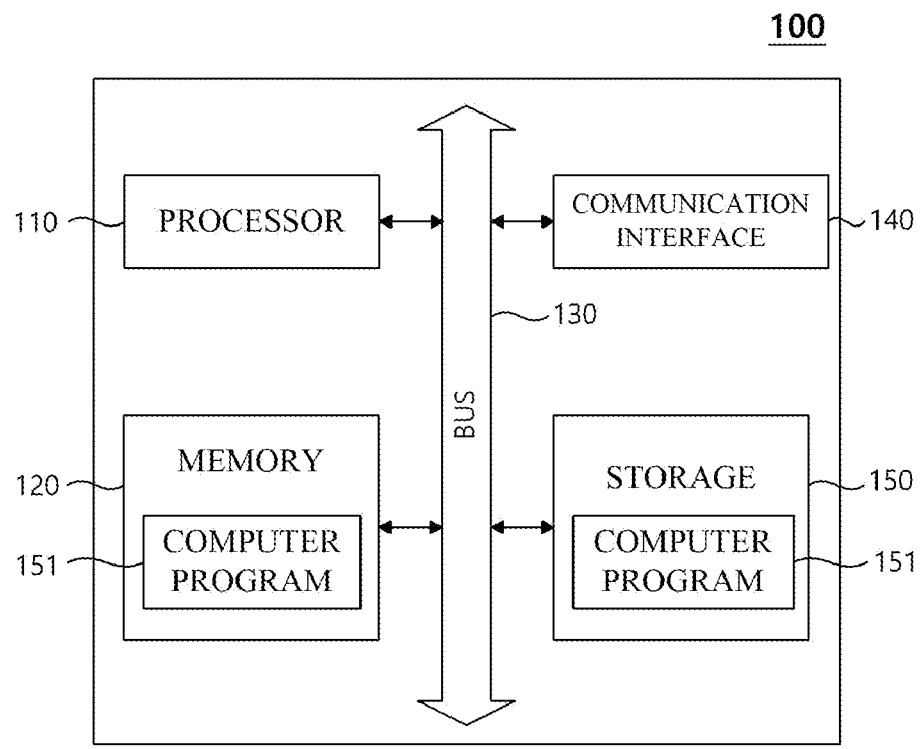
FIG. 2 is a hardware configuration diagram illustrating an apparatus for creating a driving route of an autonomous vehicle according to another embodiment of the present disclosure.

FIG. 2 is a hardware configuration diagram illustrating an apparatus for creating a driving route of an autonomous vehicle according to another embodiment of the present disclosure.

Referring to FIG. 2, a driving route creating apparatus 100 according to another embodiment of the present disclosure (hereinafter referred to as a "computing device 100") may include at least one processor 110, a memory 120 configured to load therein a computer program 151 to be executed by the at least one processor 110, a bus 130, a communication interface 140, and a storage 150 storing the computer program 151. Here, FIG. 2 illustrates only components related to the embodiment of the present disclosure. Therefore, it will be apparent to those of ordinary skill in the art that other general-purpose components may be further provided, as well as the components illustrated in FIG. 2.

The processor 110 controls overall operations of the computing device 100. The processor 110 may include a central processing unit (CPU), a microprocessor unit (MPU), a micro controller unit (MCU), a graphic processing unit (GPU), or any type of processor well known in the technical field of the present disclosure.

The processor 110 may perform an operation on at least one application or program for executing methods according to embodiments of the present disclosure, and the computing device 100 may include one or more processors.

In various embodiments, the at least one processor 110 may further include a random access memory (RAM) (not shown) and a read-only memory (ROM) (not shown) for temporarily and/or permanently storing signals (or data) processed in the processor 110. The processor 110 may be embodied in the form of a system-on-chip (SoC) including at least one of a graphic processor, a RAM, and a ROM.

The memory 120 stores various types of data, instructions, and/or information. The memory 120 may load the computer program 151 from the storage 150 to execute a method/operation according to various embodiments of the present disclosure. When the computer program 151 is loaded in the memory 120, the processor 110 may execute one or more instructions constituting the computer program 151 to perform the method/operation. The memory 120 may be embodied as a volatile memory such as a RAM but the technical scope of the present disclosure is not limited thereto.

The bus 130 provides a communication function between the components of the computing device 100. The bus 130 may be embodied as a various types of buses such as an address bus, a data bus, and a control bus.

The communication interface 140 supports wired or wireless Internet communication of the computing device 100. The communication interface 140 may also support various communication methods other than Internet communication. To this end, the communication interface 140 may include a communication module well known in the technical field of the present disclosure. In some embodiments, the communication interface 140 may be omitted.

The storage 150 may store the computer program 151 non-temporarily. When a process of creating a driving route of an autonomous vehicle is performed by the computing device 100, the storage 150 may store various types of information necessary to provide this process.

The storage 150 may include a non-volatile memory, such as a ROM, an erasable programmable ROM (EPROM), an electrically erasable programmable ROM (EEPROM) or a flash memory, a hard disc, a detachable disk, or any type of computer-readable recording medium well known in the technical field to which the present disclosure pertains.

The computer program 151 may include one or more instructions causing the at least one processor 110 to perform a method/operation according to various embodiments of the present disclosure when the computer program 151 is loaded in the memory 120. That is, the at least one processor 110 may execute the one or more instructions to perform the method/operation according to various embodiments of the present disclosure.

In an embodiment, the computer program 151 may include one or more instructions to perform a method of creating a driving route of an autonomous vehicle, the method including obtaining information about a start point and an end point, setting an intermediate point between the start point and the end point, and creating a driving route connecting the start point, the set intermediate point, and the end point.

The operations of the methods or algorithm described above in connection with embodiments of the present disclosure may be implemented directly as hardware, a software module executed by hardware, or a combination thereof. The software module may reside in a RAM, a ROM, an EPROM, an EEPROM, a flash memory, a hard disk, a removable disk, a compact disk (CD)-ROM, or any form of computer-readable recording medium well known in the technical field to the present disclosure pertains.

Components of the present disclosure may be embodied in the form of a program (or an application) and stored in a medium to be executed in combination with a computer which is hardware. The components of the present disclosure may be implemented by software programming or software elements, and similarly, embodiments may be implemented in a programming or scripting language such as C, C++, Java, or an assembler, including data structures, processes, routines, or various algorithms which are combinations of other programming components. Functional aspects may be embodied as an algorithm executable by one or more processors. A method of creating a driving route of an autonomous vehicle by the computing device 100 will be described with reference to FIGS. 3 to 11 below.

Figure 3:
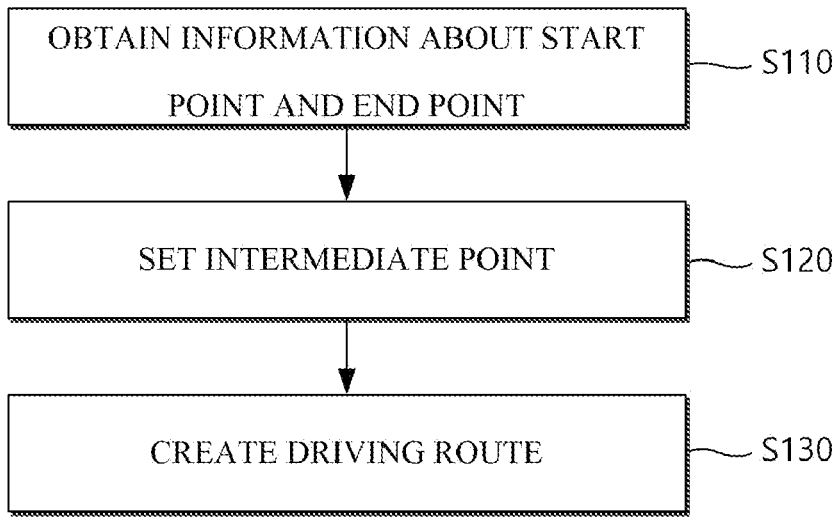
FIG. 3 is a flowchart of a method of creating a driving route of an autonomous vehicle according to another embodiment of the present disclosure.

FIG. 3 is a flowchart of a method of creating a driving route of an autonomous vehicle according to another embodiment of the present disclosure.

Here, it is described that the method of creating a driving route of an autonomous vehicle shown in FIG. 3 is performed by the computing device 100, but the present disclosure is not limited thereto and the user terminal 200 or a control system of the autonomous vehicle 10 may perform this method by receiving software for performing the method of creating a driving route of an autonomous vehicle from the computing device 100.

Referring to FIG. 3, in operation S110, the computing device 100 may obtain information about a start point and an end point for creating a driving route.

Here, the driving route of the autonomous vehicle 10 may be represented by a polynomial function based on a driving distance of the autonomous vehicle 10.

Here, the polynomial function represented by the driving route of the autonomous vehicle may be a function of an angle θ (theta) of movement of the autonomous vehicle 10, i.e., a function representing an angle of movement (e.g., a heading direction such as cardinal points of the autonomous vehicle 10) at a position of the autonomous vehicle 10. For example, the function of the angle of movement may be represented by, but is not limited to, a polynomial expression indicating an angle of movement according to a driving distance of a vehicle, i.e., a polynomial expression with the driving distance of the vehicle as a parameter.

In various embodiments, a polynomial function (driving route) created by the computing device 100 may satisfy the continuity conditions for a curvature. As described above, because a driving route created by the computing device 100 indicates an angle of movement of the autonomous vehicle 10, a curvature κ (Kappa) obtained by first differentiating the driving route may be understood as movement of a steering wheel, i.e., a steering angle, of the autonomous vehicle 10. Therefore, when a first derivative of the polynomial function representing the driving route indicates discontinuity, i.e., a discontinuous curvature (which means that differentiation cannot be performed), it means that an angle of the steering wheel of the autonomous vehicle 10 is changed to a large degree that is almost impossible to achieve within a short time or without an intermediate change process.

Accordingly, the computing device 100 may create a driving route by generating a polynomial function representing the driving route to reflect the above factors so that the polynomial function may be continuous (differentiable) in all sections and thus movement of the steering wheel of the autonomous vehicle 10 may not be sharply changed.

Here, the information about the start point may include coordinates (e.g., 2D coordinates in the form of (X,Y)) of the start point and an angle of movement of the autonomous vehicle 10 at the start point. However, the information about the start point is not limited thereto and may further include one or more of continuity conditions for a curvature of a polynomial function of the driving route including the start point.

The information about the end point may include coordinates (e.g., 2D coordinates in the form of (X,Y)) of the end point and an angle of movement of the autonomous vehicle 10 at the end point. However, the information about the end point is not limited thereto and may further include one or more continuity conditions for a curvature of a polynomial function of the driving route including the end point, similar to the information about the start point.

In various embodiments, the computing device 100 may set one or more continuity conditions for the curvatures included in the information about the start point and the information about the end point to be different from a continuity condition for a curvature that the polynomial function representing the driving route should satisfy.

As described above, because the curvature (first derivative) of the polynomial function of the driving route indicates an orientation or an angle of the steering wheel of the autonomous vehicle 10, a certain continuity condition for the curvature of the polynomial function of the driving route should be satisfied to prevent the angle of the steering wheel from being changed to a large degree that is almost practically impossible to achieve. In an embodiment set forth herein, a method of creating a driving route to satisfy the continuity conditions is provided.

On the other hand, whenever an order of a (differentiable) continuous derivative in the polynomial function representing the driving route increases, the polynomial function representing the driving route has a softer curve, i.e., a smoother curve, and thus, the number of times of differentiating the polynomial function should be increased to obtain a driving route having a soft curved shape. For example, when the steering wheel may be rotated at a constant speed all the time, actually, it is more natural that the speed of rotation of the steering wheel is increased gradually from zero and reduced gradually to zero. As described above, as an angle of movement of a vehicle and a curvature calculated by differentiating the angle of movement are represented by a higher-order function, the vehicle may be moved more smoothly and naturally.

Thus, the one or more continuity conditions for the curvatures at the start point and the end point are conditions for not only simply preventing an angle of the steering wheel from being sharply changed but also setting a degree of softness of a curve of a driving route of a section including the start point and the end point. That is, the computing device 100 may receive a continuity condition for a smoothness of the vicinity of a driving route near the start point of the driving route from a user, separately from a continuity conditions for the entire driving route. However, the present disclosure is not limited thereto.

In various embodiments, the computing device 100 may receive a boundary condition (e.g., 5) for the start point and the end point as information about the start point and the end point. In this case, an order of the polynomial function including the start point and the end point may be determined by a type and number of boundary conditions, but the present disclosure is not limited thereto and an order of a polynomial expression including the start point and the end point may be determined and thereafter a type and number of boundary conditions may be determined.

In various embodiments, the computing device 100 may collect map data of a certain region, provide the user terminal 200 with a UI for outputting the collected map data, selecting a start point and an end point by obtaining one or more user inputs indicating the start point and the end point (e.g., a user input to select the start point and the end point on the map data, an input of a search word related to the start point and the end point through a search bar, or the like) through the UI output through the display of the user terminal 200, and collect information about the selected start point and end point from the map data. However, the present disclosure is not limited thereto.

In operation S120, the computing device 100 may set one or more intermediate points between the start point and the end point.

In various embodiments, the computing device 100 may collect map data about a region including a start point and an end point, provide the user terminal 200 with a UI for outputting the collected map data, select one or more intermediate points by obtaining one or more user inputs indicating an intermediate point on the map data output to a display of the user terminal 200, and collect information about the selected one or more intermediate points from the map data.

Here, the information about the one or more intermediate points may include coordinates (e.g., (X, Y)) of each of the one or more intermediate points but is not limited thereto and may include general-purpose information.

In various embodiments, the computing device 100 may perform an image analysis on map data of a region including a start point and an end point to set one or more intermediate points between the start point and the end point. For example, the computing device 100 may perform the image analysis on the map data of the region using an image analysis model (e.g., a convolution neural network (CNN) model, a recurrent neural network (RNN) model, or a combination thereof) to identify lanes of the road connecting the start point and the end point, and select at least one intermediate point between the start point and the end point on the basis of a result of identifying the lanes of the road.

For example, the computing device 100 may obtain attribute information about the road, e.g., the number of the lanes, a width of the lanes, a shape of the road, etc. on the basis of the result of identifying the lanes of the road and thus set one or more intermediate points (e.g., a curved section and the like) between the start point and the end point. However, the present disclosure is not limited thereto.

In various embodiments, the computing device 100 may receive information about a smoothness of a driving route from a user who will create the driving route and select one or more intermediate points.

Here, the smoothness of the driving route is a criterion indicating degrees of smoothness and softness of a curve of a polynomial function representing the driving route. As described above, because the curve of the polynomial function becomes gentler and smoother as the number of times the polynomial function is differentiable increases, a smoothness of the driving route may be input to the computing device 100 in the form of the number of times of differentiating the polynomial function to be generated (e.g., continuity conditions for a curvature).

In various embodiments, the computing device 100 may receive information about a smoothness for a driving route from a user who will create the driving route, and adjust positions of one or more intermediate points set by the user such that a polynomial function of the driving route connecting the one or more intermediate points may satisfy the smoothness for the driving route, which is input from the user, when the polynomial function of the driving route connecting the one or more intermediate points does not satisfy the smoothness for the driving route.

In various embodiments, the computing device 100 may receive information about a smoothness for a driving route from a user who will create the driving route and additionally select one or more intermediate points to satisfy the smoothness for the driving route when a polynomial function of the driving route connecting the one or more intermediate points does not satisfy the smoothness for the driving route. For example, the computing device 100 may select a first intermediate point and a second intermediate point between a start point and an end point selected by a user and may select a third intermediate point, which is a new intermediate point, between the first and second intermediate points to satisfy a third continuous derivative when a polynomial function connecting the first and second intermediate points does not satisfy a smoothness (e.g., the third continuous derivative) input from the user. However, the present disclosure is not limited thereto.

In this case, when an intermediate point is to be additionally set to satisfy a smoothness for a driving route, the computing device 100 may determine whether a driving route satisfying the smoothness for the driving route is calculable by adding only one intermediate point at an initial stage and increase the number of intermediate points by one when the smoothness for the driving route is not satisfied by adding one intermediate point. Accordingly, it is possible to prevent a great deal of time from being wasted to create a driving route due to a large amount of data processing when a large number of intermediate points are added at once.

In operation S130, the computing device 100 may create a driving route connecting the start point, the one or more intermediate points, and the end point.

In various embodiments, the computing device 100 may generate a curve connecting a start point and one or more intermediate points, a curve connecting the one or more intermediate points (e.g., a curve connecting midpoints between one or more intermediate points when the number of one or more intermediate points is more than two) and a curve connecting the one or more intermediate points and the end point, and connect the generated curves to create a driving route with a set of curves.

Figure 4:
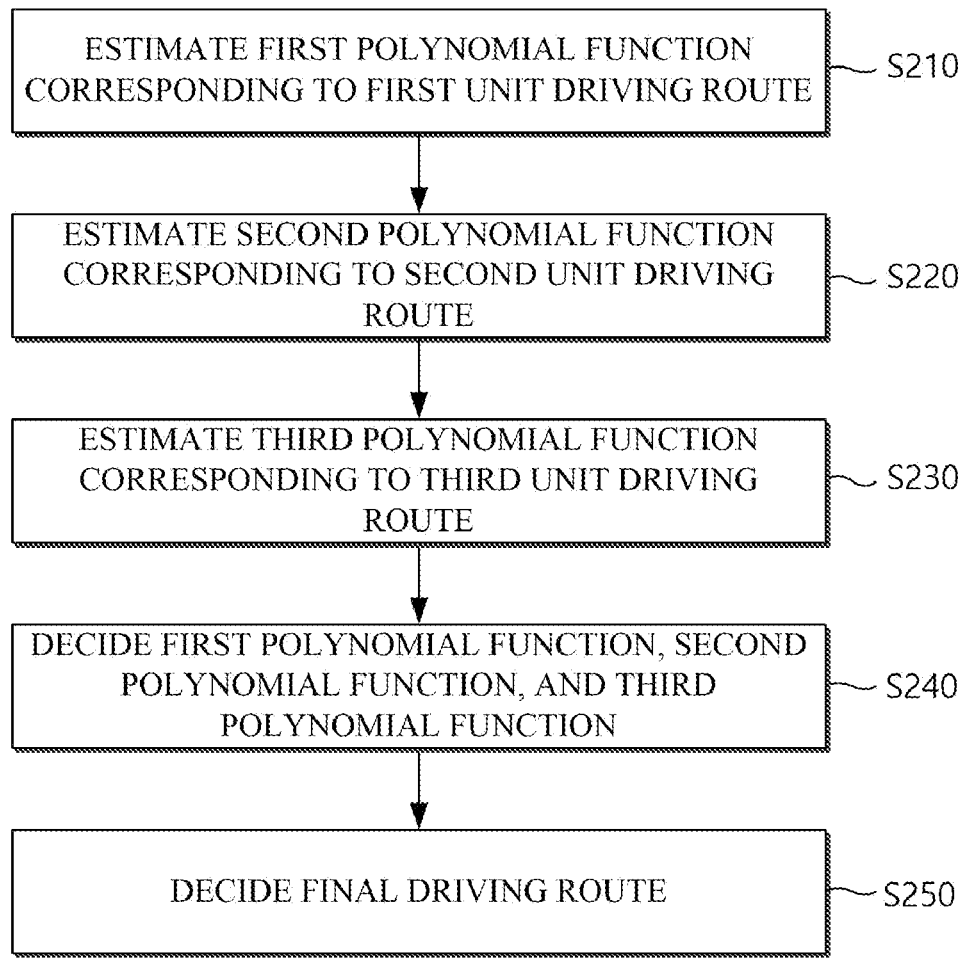
FIG. 4 is a flowchart of a method of creating a final driving route by connecting a plurality of unit driving routes according to various embodiments.

In this case, the computing device 100 may determine the number of curves to be included in the driving route on the basis of the number of the one or more intermediate points set in operation S120. For example, when the number of the set one or more intermediate points is two, the computing device 100 may create a first curve connecting the start point and a first intermediate point, a second curve connecting the first intermediate point and a second intermediate point, and a third curve connecting the second intermediate point and the end point, i.e., three curves (N+1) (here, N denotes the number of intermediate points). FIG. 4 will be described below.

FIG. 4 is a flowchart of a method of creating a final driving route by connecting a plurality of unit driving routes according to various embodiments.

First, before performing a method of creating a final driving route by connecting a plurality of unit driving routes shown in FIG. 4, the computing device 100 may set the number of unit driving routes to be generated according to the number of intermediate points between a start point and an end point.

Here, in the method of creating a final driving route by connecting a plurality of unit driving routes described above with reference to FIG. 4, it is assumed that the number of one or more intermediate points (e.g., a first intermediate point and a second intermediate point) is two, but this is only an example provided to more easily describe the technical features of the present disclosure, and thus the present disclosure is not limited thereto.

Here, it is described that the method of creating a final driving route by connecting a plurality of unit driving routes is performed by the computing device 100 but is not limited thereto and may be performed by the user terminal 200 or the control system of the autonomous vehicle by receiving software for performing the method of creating a final driving route by connecting a plurality of unit driving routes from a user and creating a final driving route by connecting a plurality of unit driving routes.

Although it is illustrated that operations included in the method of creating a final driving route by connecting a plurality of unit driving routes shown in FIG. 4 are performed sequentially, the present disclosure is not limited thereto and these operations may be performed in a different order or simultaneously.

Referring to FIG. 4, in operation S210, the computing device 100 may estimate a first polynomial function corresponding to a first unit driving route connecting a start point and a first intermediate point.

First, the computing device 100 may set boundary conditions for the start point and an end point. For example, the computing device 100 may receive data about the start point and the end point (e.g., positions of the start and end points, an angle of movement of the autonomous vehicle 10, an $n^{th}$ differential value of a polynomial function, etc.) from a user through a UI, and set the received data as boundary conditions for the start point and the end point.

Thereafter, the computing device 100 may estimate a first polynomial function connecting the start point and the first intermediate point. In this case, an order of the estimated first polynomial function may be determined according to the number of the boundary conditions input and set by the user. For example, referring to a table shown in FIG. 5, the computing device 100 may determine an order of the first polynomial function as a fourth-order polynomial function when a total of six boundary conditions are set by receiving, from a user, an X-coordinate $x_i$, a Y-coordinate $y_i$, an angle of movement $\theta_i$, and a third differential value $\kappa_i'''$ ($\kappa_i'''=0$) of the start point and an X-coordinate $x_f$, a Y-coordinate $y_f$, an angle of movement $\theta_f$, and a third differential value $\kappa_f'''$ ($\kappa_f'''=0$) of the end point.

FIG. 5 illustrates the concepts of a free end and a fixed end. In an embodiment, the free end may be set when a driving route is created using only a position and orientation of a vehicle without specific prior information, and a route may be created using four boundary conditions by setting positions and orientations of the vehicle at a start point and an end point and a second differential value of a curvature to zero.

In an embodiment, the fixed end may be set when a created route is changed during traveling along the created route or a specific route joins a preset route during traveling along the specific route, and a point at which the created route is changed or a point at which the specific route joins the preset route is used as a start point or an end point. When the start point or the end point is located on the preset route and the preset route is a continuous route with a second differential value, not only a position and angle of a vehicle but also a curvature, a first differential value of the curvature, and a second differential value of the curvature may be obtained from a function of the present route. Thus, six boundary conditions may be obtained, and in this case, the start or end point is a fixed end. Embodiments in which the fixed end is used will be described with reference to FIGS. 7 and 8 below.

The computing device 100 may determine an order of a first polynomial function to be an eighth-order polynomial function when a total of twelve boundary conditions are set by receiving from a user an X-coordinate $x_i$, a Y-coordinate $y_i$, an angle of movement $\theta_i$, a first differential value $\kappa_i$, a second differential value $\kappa_i'$, and a third differential value $\kappa_i''$ of the start point and an X-coordinate $x_f$, a Y-coordinate $y_f$, an angle of movement $\theta_f$, a first differential value $\kappa_f$, a second differential value $\kappa_f'$, and a third differential value $\kappa_f''$ of the end point. However, the present disclosure is not limited thereto.

For example, it is assumed that the total of twelve boundary conditions are predetermined and a curve of a driving route having no intermediate point between a start point and an end point is created. In this case, the driving route may be represented by an angle of movement $\theta$ relative to a driving distance s. That is, the following equation may be generated.

$$\theta(s)=As^8+Bs^7+Cs^6+Ds^5+Es^4+Fs^3+Gs^2+Hs+I$$

Here, simultaneous equations specifying the above nine parameters and $s_f$ may be achieved using the twelve boundary conditions $x_i$, $y_i$, $\kappa_i$, $\kappa_i'$, $\kappa_i''$, $x_f$, $y_f$, $\theta_f$, $\kappa_f$, $\kappa_f'$, and $\kappa_f''$. That is, $\theta_i$, $\kappa_i$, $\kappa_i'$, and $\kappa_i''$ respectively correspond to $\theta(s_i)$, $\theta'(s_i)$, $\theta''(s_i)$, and $\theta'''(s_i)$, $\theta_f$, $\kappa_f$, $\kappa_f'$, and $\kappa_f''$ respectively correspond to $\theta(s_f)$, $\theta'(s_f)$, $\theta''(s_f)$, and $\theta'''(s_f)$. Here, $s_i$ denotes a driving distance at the start point on the driving distance and may be 0 in an embodiment. Here, $s_f$ denotes a driving distance at the end point on the driving route.

As described above, the computing device 100 may determine an order of the polynomial expression specifiable according to the number of predetermined boundary conditions or may determine an order of a desired polynomial expression according to circumstances and automatically set boundary conditions necessary to specify the order of the polynomial expression or request a user to input boundary conditions. For example, the computing device 100 may set a secondary differential value of a curvature to zero when four boundary conditions are needed, additionally set a primary differential value of the curvature to zero when five boundary conditions are needed, and additionally set a value of the curvature to zero when six boundary conditions are needed, but the present disclosure is not limited thereto.

In an embodiment, four boundary conditions may be set with respect to a start point, four boundary conditions may be set with respect to an end point, and a route with two intermediate points may be created. In this case, when it is assumed that a selected level of smoothness is $C^4$, all of a curve connecting the start point and a first intermediate point, a curve connecting the first intermediate point and a second first intermediate point, and a curve connecting the second intermediate point and the end point may be set as fourth-order polynomial functions.

That is, the three curves may be set as the following polynomial functions:

$$\theta_1(s)=As^4+Bs^3+Cs^2+Ds+E$$

$$\theta_2(s)=Fs^4+Gs^3+Hs^2+Is+J$$

$$\theta_3(s)=Ks^4+Ls^3+Ms^2+Ns+O$$

In the polynomial expressions above, s may denote a driving route. In each of the curves (i.e., the polynomial expressions), a length of the driving route may be set to zero at an initial stage, and a start point, an end point, a first intermediate point, and a second intermediate point of the entire driving rouges may be set to $s_i$, $s_f$, $s_1$, and $s_2$, respectively.

In this case, the polynomial expression may be expressed by the following:

$$\theta_1(s)=A(s-s_i)^4+B(s-s_i)^3+C(s-s_i)^2+D(s-s_i)+E$$

$$\theta_2(s)=F(s-s_1)^4+G(s-s_1)^3+H(s-s_1)^2+I(s-s_1)+J$$

$$\theta_3(s)=K(s-s_2)^4+L(s-s_2)^3+M(s-s_2)^2+N(s-s_2)+O$$

Simultaneous equations specifying a total of twelve parameters, $s_1$, $s_2$ and $s_f$ may be obtained using continuity conditions (e.g., consecutive points $\theta_1'''(s_1)=\theta_2'''(s_1)$, $\theta_2'''(s_2)=\theta_3'''(s_2)$) at intersections (e.g., a first intermediate point and a second intermediate point) of a third derivative of each of three polynomial expressions and the three curves) for values of start points, end points, and curvatures of the three curves to satisfy the boundary conditions illustrated in FIG. 6 with respect to the three curves.

Here, the X-coordinate and the Y-coordinate may be obtained by adding a reference offset (e.g., x and y coordinates of the start point of each of the curves) to a value obtained by integrating cos $\theta(s)$ and sin $\theta(s)$ according to a driving distance.

Thus, the computing device 100 may create a driving route in which the smoothness of each curve is maintained and continuity conditions for a curvature between adjacent curves are satisfied.

In operation S220, the computing device 100 may estimate a second polynomial function corresponding to a second unit driving route connecting the first intermediate point and the second intermediate point.

First, the computing device 100 may receive the smoothness of the driving route of the autonomous vehicle and set one or more continuity conditions for a curvature of a polynomial function connecting the first intermediate point and the second intermediate point on the basis of the smoothness.

For example, the computing device 100 may receive information about one of levels of smoothness of a predetermined driving route (e.g., $C^0$, $C^1$, $C^2$, $C^3$ and $C^4$), which is selected by a user and set one or more continuity conditions for a curvature corresponding to the selected smoothness. The computing device 100 may set continuity conditions to set the second polynomial function without being cut off when the level of smoothness selected by the user is $C^0$ and may set the second polynomial function to be continuous when the level of smoothness selected by the user is $C^1$. A first derivative (a curvature function) of the second polynomial function may be set to be continuous when the level of smoothness selected by the user is $C^2$, a second derivative (a first derivative of a curvature) of the second polynomial function may be set to be continuous when the level of smoothness selected by the user is $C^3$, and a third derivative (a second derivative of a curvature) of the second polynomial function may be set to be continuous when the level of smoothness selected by the user is $C^4$. However, the above description is only an example and the present disclosure is not limited thereto.

In various embodiments, when three or more intermediate points are set and two or more curves between the intermediate points are generated (e.g., when a first intermediate point, a second intermediate point, and a third intermediate point are set and a curve connecting the first intermediate point and the second intermediate point and a curve connecting the second intermediate point and the third intermediate point are generated), the computing device 100 may receive information about smoothness of the curves that are individually set. Therefore, the curves between the intermediate points may be set to have a different smoothness.

Thereafter, the computing device 100 may estimate a second polynomial function connecting the first intermediate point and the second intermediate point. In this case, an order of the estimated second polynomial function may be determined based on one or more continuity conditions for the set curvature. For example, when the level of smoothness selected by the user is $C^4$ and thus the continuity condition for the curvature is to set for the third derivative (the second derivative of the curvature) of the second polynomial function to be continuous, an order of the estimated second polynomial function may be determined to be a fourth-order polynomial function. However, the present disclosure is not limited thereto, and when an input of a smoothness for the driving route is not obtained from a user, the order of the second polynomial function may be set to be the same as the order of the first polynomial function generated in operation S210 or set to a preset order (e.g., fourth order).

In operation S230, the computing device 100 may estimate a third polynomial function corresponding to a third unit driving route connecting the second intermediate point and the end point.

First, the computing device 100 may estimate a third polynomial function connecting the second intermediate point and the end point. In this case, an order of the estimated polynomial function may be determined based on the number of the boundary conditions set in operation S210. Here, a method of determining an order of the third polynomial function on the basis of the number of boundary conditions may be implemented in the same manner as the method of determining the order of the first polynomial function, which is performed in operation S210.

That is, in operation S210, the order of the first polynomial expression connecting the start point and the first intermediate point is determined on the basis of the number of boundary conditions, and thus the computing device 100 may determine an order of the third polynomial expression to be the same as the order of the first polynomial expression determined in operation S210 without additionally determining an order of the third polynomial expression connecting the second intermediate point and the end point.

In addition, in order to generate the third polynomial function, the computing device 100 may estimate the third polynomial function such that an order of the third polynomial function is determined in advance in the same manner as the method of generating the first polynomial function, determine a type and number of pieces of data to be received as boundary conditions according to the order of the estimated third polynomial function, and receive data from a user according to the determined type and number. However, the present disclosure is not limited thereto.

In operation S240, the computing device 100 may decide the first polynomial function estimated in operation S210, the second polynomial function estimated in operation S220, and the third polynomial function estimated in operation S230.

For example, the computing device 100 may calculate parameters of the first polynomial function, the second polynomial function, and the third polynomial function, which are estimated using the coordinates of the start point and the end point, the angles of movement of the autonomous vehicle 10 at the start point and the end point, the set boundary conditions, the coordinates of the first intermediate point, a continuity condition at an intersection of the first polynomial function and the second polynomial function (the first intermediate point), and a continuity condition at an intersection of the second polynomial function and the third polynomial function (the second intermediate point), and may decide the first polynomial function, the second polynomial function, and the third polynomial function using the calculated parameters.

In operation S250, the computing device 100 may create a final driving route of the autonomous vehicle 10 by connecting the first polynomial function corresponding to the first unit driving route, the second polynomial function corresponding to the second unit driving route, and the third polynomial function corresponding to the third unit driving route. In this case, the final driving route may connect the first polynomial function, the second polynomial function, and the third polynomial function to satisfy one or more continuity conditions for the curvature at the first intermediate point and the second intermediate point.

In other words, as the three polynomial functions are connected, an angle of the steering wheel of the autonomous vehicle 10 at the first and second intermediate points may be sharply changed when the continuity conditions for the curvature at the first and second intermediate points to which polynomial functions are connected are not satisfied, and thus, this problem may be prevented by connecting the polynomial functions such that the continuity conditions at the first and second intermediate points are satisfied.

In various embodiments, the computing device 100 may display a final driving route through a UI (a UI output to the user terminal 200) when the final driving route of the autonomous vehicle 10 is created through the operations of creating the final driving route (operations S210 to S240).

The method of creating a driving route of an autonomous vehicle has been described above with reference to the drawing. For a brief description, the method of creating a driving route of an autonomous vehicle has been described above using a series of blocks, but the present disclosure is not limited to the order of the blocks, and some of the blocks may be performed in an order different from that shown and described herein or substantially simultaneously. In addition, the method may be performed in a state in which a new block that is not described in the present specification and the drawing is added or some blocks are deleted or changed. A method of changing a driving route of an autonomous vehicle 10 that is traveling along the driving route created by the above method will be described with reference to FIGS. 7 and 8 below.

Figure 7:
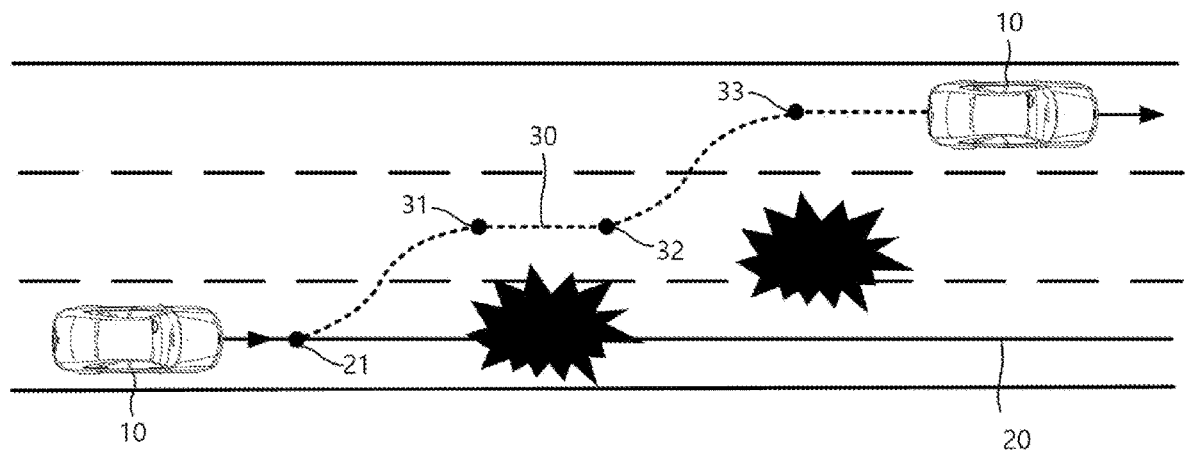
FIG. 7 is a diagram illustrating a process of changing a driving route of an autonomous vehicle according to various embodiments.

FIG. 7 is a diagram illustrating a process of changing a driving route of an autonomous vehicle according to various embodiments.

Referring to FIG. 7, the computing device 100 may reset one or more intermediate points 31, 32 and 33 between an end point and a position 21 of an autonomous vehicle 10 at a point in time when a driving route is requested to be changed when the driving route is requested to be changed with respect to the autonomous vehicle 10 traveling along a first driving route 20 created by the method (operations S110 to S130 or operations S210 to S240).

For example, the computing device 100 may reset one or more intermediate points 31, 32 and 33 between the end point and the position 21 of the autonomous vehicle 10 at the point in time when the driving route is to be changed when the driving route is to be changed due to traffic congestion or an event (e.g., an accident, construction work, an obstacle or the like) occurring in the first driving route 20 or due to a change of a destination (the end point). Here, the end point refers to a preset end point when the driving route is required to be changed due to the occurrence of the event or a changed destination when the driving route is requested to be changed due to a change of a destination. For example, both a start point and an end point on a changed route may be located on an existing route but may not be located on the existing route. For example, when a destination is different due to deviation from an existing route, an end point may not be located in the existing route, and when an end point for returning back to the existing route is not set in advance when deviating from the existing route, a route may be created on the basis of an end point that is not located in the existing route, and thereafter, a driving route with a start point that is not located in the existing route and an end point located in the existing route may be created when an end point for returning back to the existing route is determined. Accordingly, a route with a start point and an end point, both of which are fixed ends or a route with a start point and an end point, one of which is only a fixed end, may be created. An example of a method of setting an order of curves in a driving route according to whether a start point and an end point are each a free end or a fixed end is illustrated in FIG. 5.

In this case, the computing device 100 may reset one or more intermediate points 31, 32 and 33 to avoid traffic congestion or an event (e.g., an accident, construction work, an obstacle or the like) occurring in a driving route when the driving route is to be changed due to the traffic congestion or the event. Here, the one or more intermediate points 31, 32, and 33 may be selected to avoid the event on the basis of a smoothness of the driving route input from a user to create the driving route. However, when intermediate points satisfying both the smoothness of the driving route input from the user and the avoidance of the event cannot be selected, intermediate points may be selected first in consideration of the avoidance of the event.

Thereafter, the computing device 100 may extract data about the position 21 of the autonomous vehicle 10 at a point in time when a driving route change is requested from a polynomial function for the first driving route 20.

Because the position 21 of the autonomous vehicle 10 at the point in time when the driving route change is requested refers to a point in the first driving route 20 created in advance, when the position 21 of the autonomous vehicle 10 is input to a polynomial function corresponding to the first driving route 20 created in advance, data about the position 21 of the autonomous vehicle (e.g., coordinates of the position 21, an angle of movement, continuity information for a curvature, etc.) at the point in time when the driving route change (the change of the driving route deviating from the first driving route 20 created previously) is requested may be easily obtained without having to receive information about the position 21 directly from a user.

This technical feature may also be applied when a driving route connecting a start point, an intermediate point, and an end point does not satisfy a specific condition and thus an intermediate point is newly added. For example, when a driving route connecting a start point, an intermediate point, and an end point does not satisfy a smoothness of a driving route set by a user or does not satisfy a specific condition due to the shape of the road, a position of an obstacle, or the like, a driving route is calculated by newly setting three intermediate points at once (i.e., when a total of four intermediate points are set), an operation of generating a polynomial function for a total of five curves need be performed and thus the amount of data to be processed is large. In some cases, it will take a great deal of time to create a driving route.

When the driving route connecting the start point, the intermediate point, and the end point does not satisfy the smoothness of the driving route set by the user and thus a driving route is calculated first by adding only one intermediate point, only one polynomial function for three curves need be calculated and thus a relative short time may be incurred therefor, and when the smoothness of the driving route set by the user is not satisfied by simply adding one intermediate point and thus a new intermediate point is added, a data value may be more easily extracted using a polynomial function for a previously created driving route. Because it does not take a great deal of time to create a driving route further including additionally added intermediate points, a driving route may be created more quickly.

In various embodiments, when a polynomial function for the first driving route 20 is a fourth-order polynomial function, the position 21 of the autonomous vehicle 10 at the point in time when the driving route change is requested is input to the fourth-order polynomial function so as to obtain six data values (an X-coordinate and a Y-coordinate of the position 21 of the autonomous vehicle 10 at the point in time when the driving route change is requested, an angle of movement, a curvature, a first differential value of the curvature, and a second differential value of the curvature, and an X-coordinate and a Y-coordinate of a position of an end point, an angle of movement, a curvature, a first differential value of the curvature, and a second differential value of the curvature).

Thereafter, the computing device 100 may create a second driving route 30 connecting the position 21 of the autonomous vehicle 10 at the point in time when the driving route change is requested, the reset one or more intermediate points 31, 32, and 33, and the end point using the data extracted from the polynomial function of the first driving route 20 and the coordinates of the reset one or more intermediate points 31, 32 and 33. Here, calculating a plurality of curves (polynomial functions) connecting the position 21 of the autonomous vehicle 10, the reset one or more intermediate points 31, 32 and 33, and the end point and finally creating the second driving route 30 by connecting the calculated polynomial functions may be implemented in the same manner as the method (operations S110 to S130 or operations S210 to S240).

Figure 8:
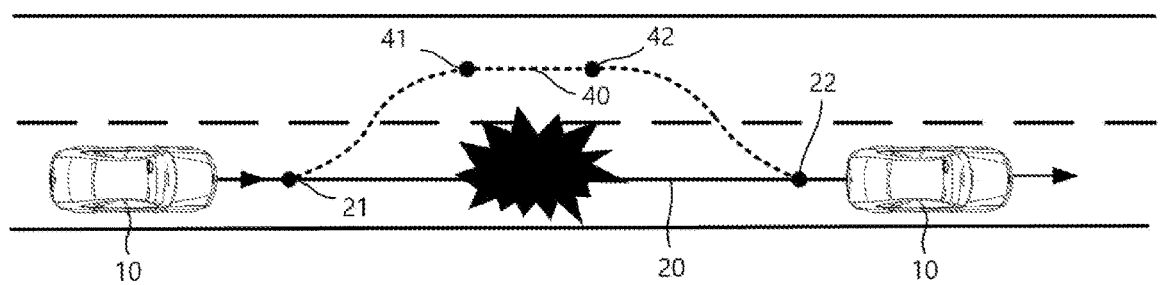
FIG. 8 is a diagram illustrating a process of avoiding an event occurring in a driving route by an autonomous vehicle according to various embodiments.

FIG. 8 is a diagram illustrating a process of avoiding an event occurring in a driving route by an autonomous vehicle according to various embodiments.

Referring to FIG. 8, when an autonomous vehicle 10 traveling along a driving route created by the method (operations S110 to S130 or operations S210 to S240) is requested to change the driving route to an avoidance route 40 (a route for returning back to an existing driving route after deviation from the existing driving route), the computing device 100 may reset one or more intermediate points 41 and 42, which are located on the created driving route, between a start point 21 and an end point 22 in the avoidance route 40.

For example, when it is determined that an event (e.g., an accident, construction work or an obstacle) occurs in the created driving route and the created driving route cannot be changed to avoid the event, the computing device 100 may reset the one or more intermediate points 41 and 42 between the start and end points 21 and 22 in the avoidance route, which are located on the created driving route, to create the avoidance route 40 for returning back to a route after deviation from the route.

In this case, the computing device 100 may reset the one or more intermediate points 41 and 42 to avoid traffic congestion or the event occurring in the driving route as shown in FIG. 8. Here, the one or more intermediate points 41 and 42 may be selected to avoid the event on the basis of a smoothness of a driving route input from a user to create the driving route. However, when intermediate points satisfying both the smoothness of the driving route input from the user and the avoidance of the event cannot be selected, intermediate points may be selected first in consideration of the avoidance of the event.

Thereafter, the computing device 100 may extract data about the start and end points 21 and 22 of the avoidance path 40 from a polynomial function for the created driving route. Here, as described above with reference to FIG. 7, because the start and end points 21 and 22 of the avoidance route 40 are located on the created driving route, when positions of the start and end points 21 and 22 of the avoidance route 40 are input to the polynomial function corresponding to the created driving route, the data about the start and end points 21 and 22 of the avoidance route may be extracted without having to receive information about the positions from the user or having to additionally set the information.

Thereafter, the computing device 100 creates the avoidance route 40 connecting the start point 21 of the avoidance route 40, the reset one or more intermediate points 41 and 42, and the end point 22 of the avoidance route 40 using the extracted data and the coordinates of the one or more intermediate points 41 and 42. Here, calculating a plurality of curves (polynomial functions) connecting the start point 21 of the avoidance route 40, the reset one or more intermediate points 41 and 42, and the end point 22 of the avoidance route 40 and finally creating the avoidance route by connecting the calculated polynomial functions may be implemented in the same manner as the method (operations S110 to S130 or operations S210 to S240). However, the present disclosure is not limited thereto. A configuration of receiving information about a start point, an intermediate point, and an end point that are selected using map data, creating a driving route according to the start point, the intermediate point, and the end point, and displaying the driving route on the map data will be described below.

FIGS. 9 to 11 are diagrams illustrating a form in which a driving route connecting a start point, one or more intermediate points, and an end point is displayed on a map according to various embodiments.

Referring to FIGS. 9 to 11, the computing device 100 may collect map data of a region and provide the user terminal 200 with a UI for outputting the map data.

In addition, the computing device 100 may obtain one or more user inputs indicating a start point 21, one or more intermediate points 22, and an end point 23 (e.g., one or more user inputs to select the start point 21, the one or more intermediate points 22, and the end point 23 on map data) through the UI of the user terminal 200 and create a final driving route connecting the start point 21, the one or more intermediate points 22 and the end point 23 (e.g., operations S210 to S240). Thereafter, the computing device 100 may display the created final driving route on the map data output through the UI.

Here, the computing device 100 may adjust positions of one or more intermediate points set by a user or additionally set an intermediate point other than the one or more intermediate points set by the user and display the additionally set intermediate point on the map data based on a smoothness of a driving route set by the user. In this case, the computing device 100 may display the position-adjusted one or more intermediate points or the additionally set intermediate point in a form (e.g., a color or a shape) different from that of the one or more intermediate points set by the user.

In this case, when the start point 21 and the end point 23 are first input to the computing device 100 from the user, the computing device 100 may create a final driving route connecting the start point 21 and the end point 23 and display the final driving route on the map data.

Thereafter, whenever an intermediate point is input to the computing device 100, the computing device 100 may update the final driving route displayed on the map data by re-creating a final driving route and outputting the re-created driving route onto the map data.

That is, when the user selects a specific point through the UI, the computing device 100 may create a final driving route by reflecting the selected point in real time and provide the user with the final driving route so that the user may easily achieve a route of the autonomous vehicle through a simple operation and intuitively identify a driving route determined according to a position of a point selected by the user.

FIGS. 12 to 16C are graphs showing a comparison between a driving route created by a driving route creating method of the related art and a driving route created by a driving route creating method by an autonomous vehicle according to various embodiments of the present disclosure.

Figure 12:
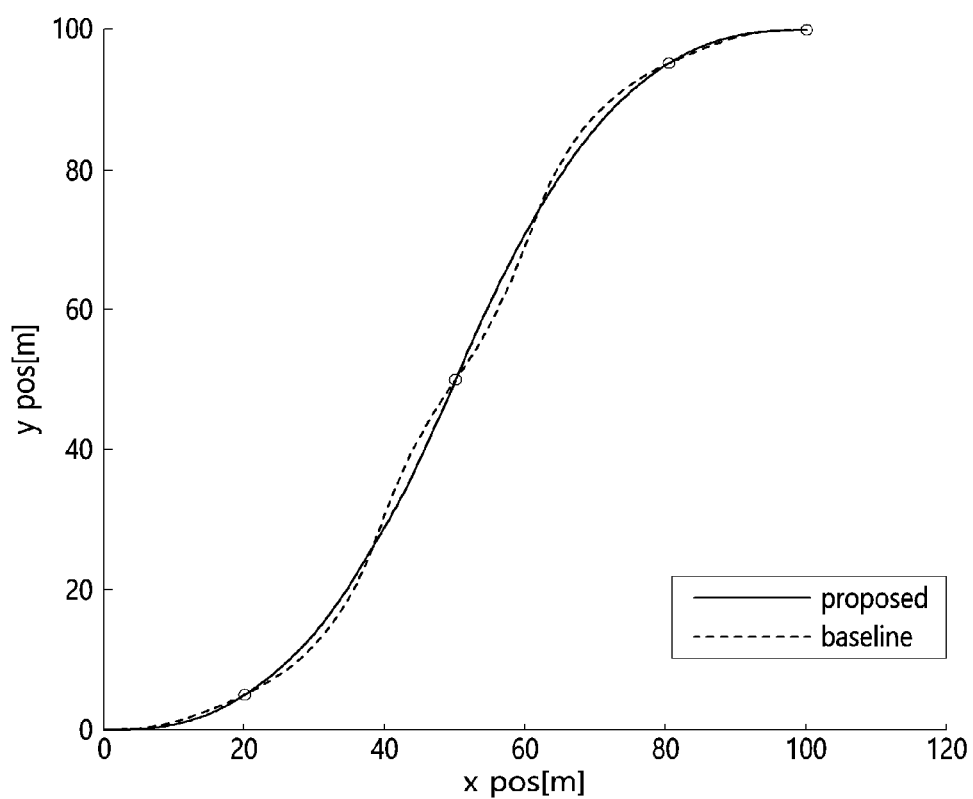
FIGS. 12 to 16C are graphs showing a comparison between a driving route created by a driving route creating method of the related art and a driving route created by a driving route creating method by an autonomous vehicle according to various embodiments of the present disclosure.
Figure 13A:
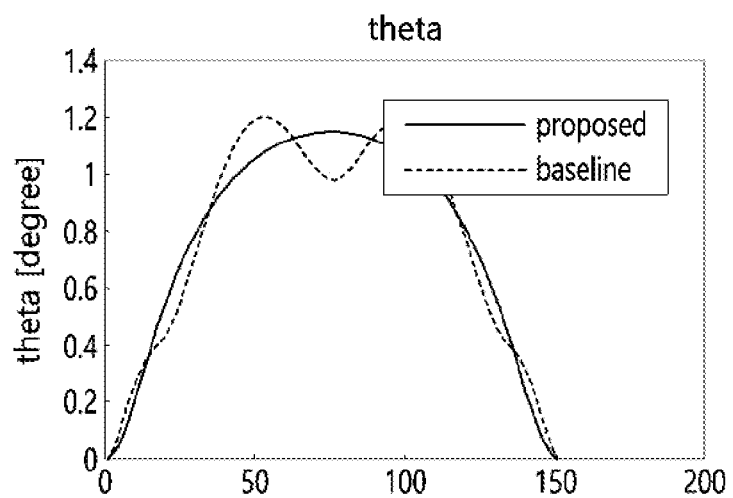
Figure 13B:
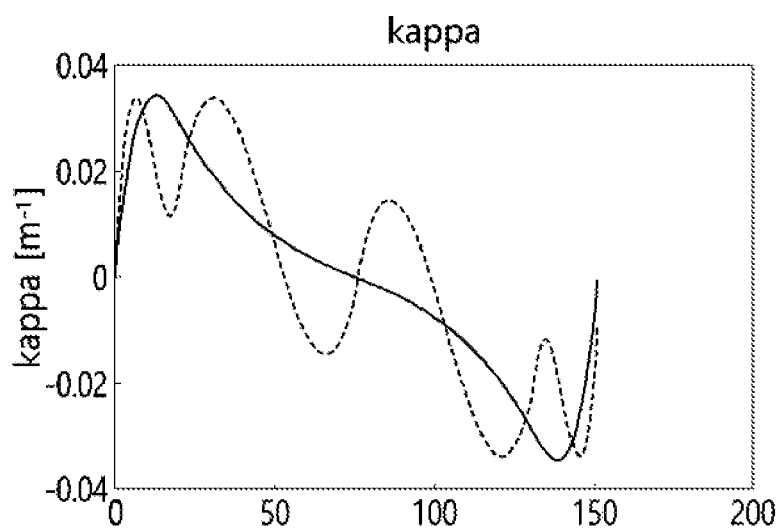

First, referring to the graphs of FIGS. 12, 13A and 13B, when a total of five curves are generated by three intermediate points between a start point which is located at coordinates (0, 0) and at which an angle of movement of the autonomous vehicle 10 is 0 degrees and a curvature (a differential value of the angle of movement) is defined as 0 and an end point which is located at coordinates (100, 100) and at which an angle of movement of the autonomous vehicle 10 is 0 degrees and a curvature is defined as 0, a red graph is a curve (baseline, origin) generated according to the related art (e.g., a cubic polynomial curvature path (CPCP) method of creating a three-dimensional (3D) curve equation connecting two points) and a blue graph is a curve (proposed, improved) generated according to various embodiments of the present disclosure.

In the related art, an explicit angle of movement (theta) and a differential value (curvature (kappa)) of an angle of movement are difficult to set at three intermediate points and thus are estimated by performing interpolation between adjacent intermediate points.

That is, because an angle of movement and a differential value are difficult to set accurately and thus estimated values thereof should be used, when a polynomial function of a curve is estimated by applying the estimated values as hard constraints to connect the CPCP curve, variations in an angle of movement and a curvature of the entire curve are unstable as shown in FIGS. 12, 13A and 13B and thus a route trajectory of the autonomous vehicle 10 does not form a perfect S-shaped curve.

In contrast, in the case of a curve generated according to various embodiments of the present disclosure, a polynomial function of the curve is calculated by optimizing an angle of movement and a curvature such that variations therein are as gentle as possible so that a calculated route trajectory may have a perfect S-shape, undesired variations in the angle of movement and the curvature may be minimized, and a route passing through a desired point may be created.

Figure 14A:
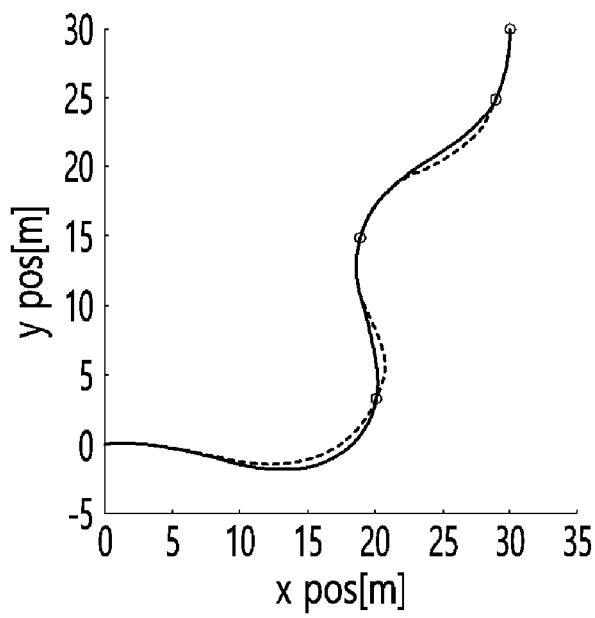
Figure 14B:
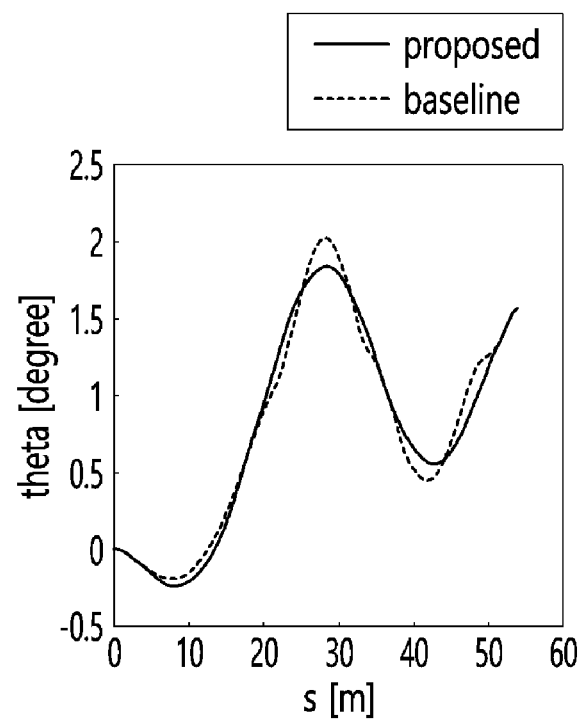
Figure 14C:
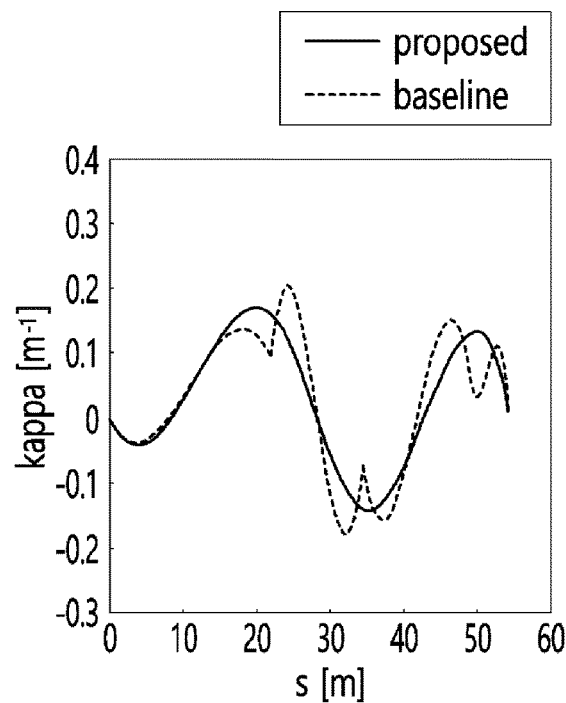

Referring to the graph of FIGS. 14A-14C, even a curved driving route with a large number of curves may be created such that a degree of movement (a variation in a curvature) of the steering wheel of the autonomous vehicle 10 is not large as compared to the related art.

Figure 15A:
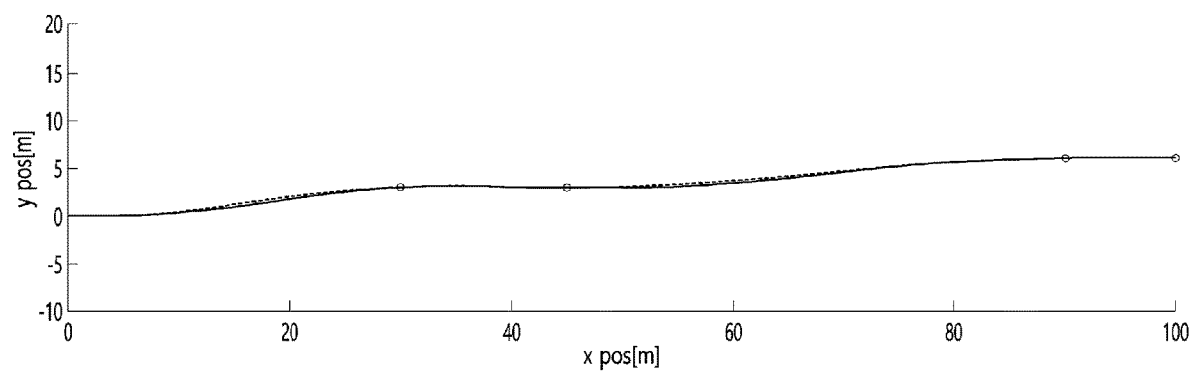
Figure 15B:
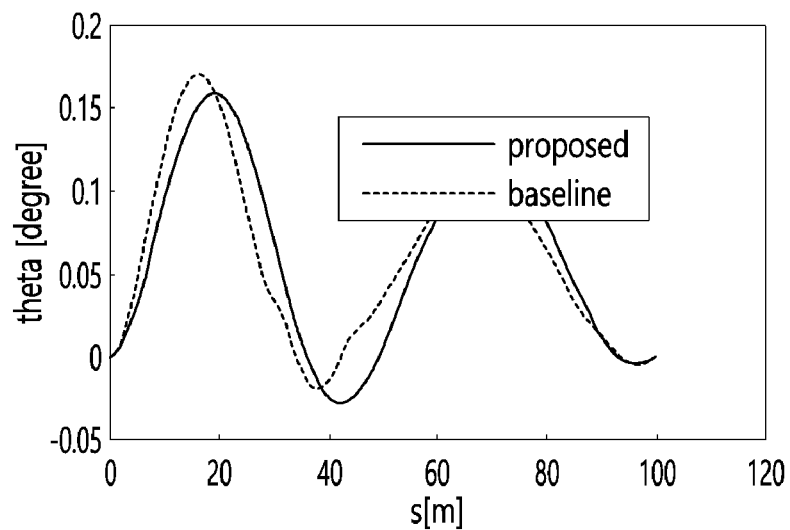
Figure 15C:
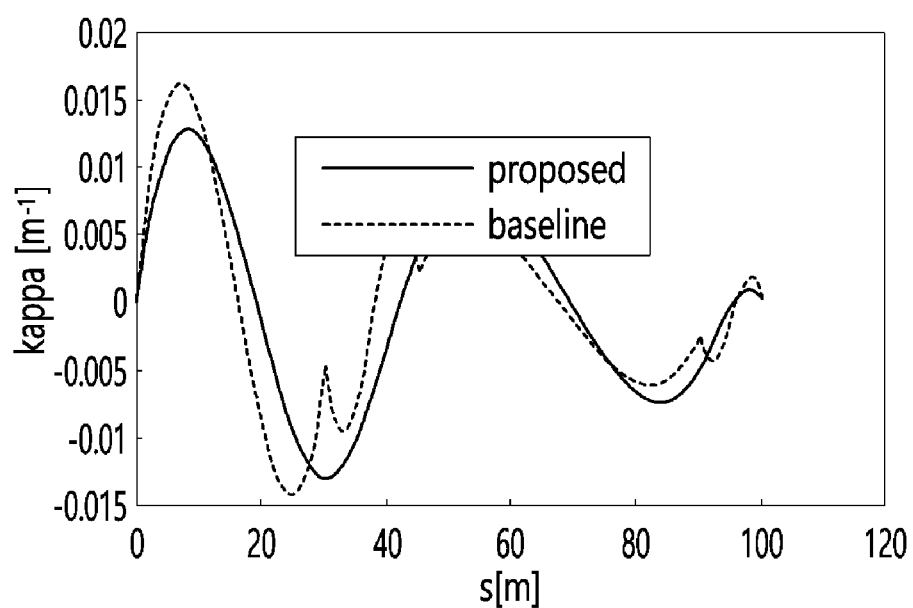
Figure 16A:
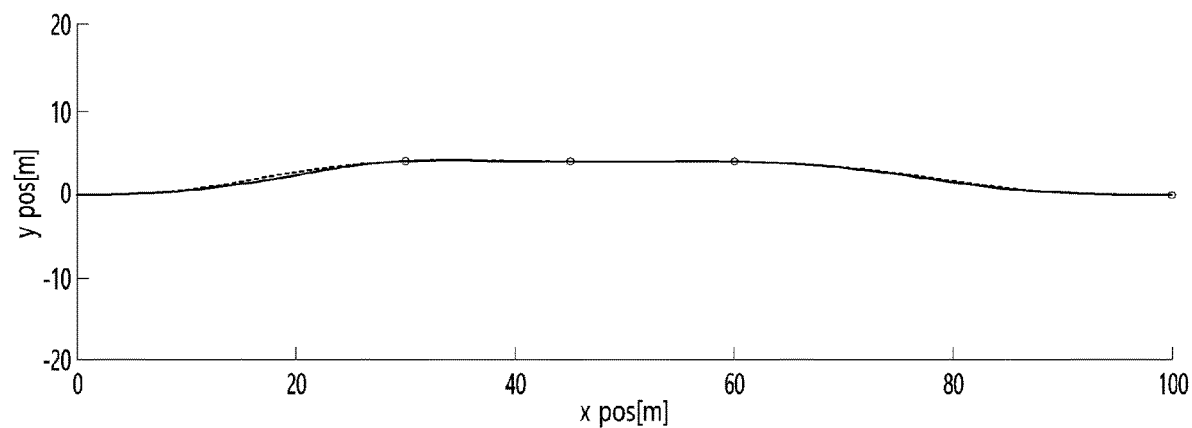
Figure 16B:
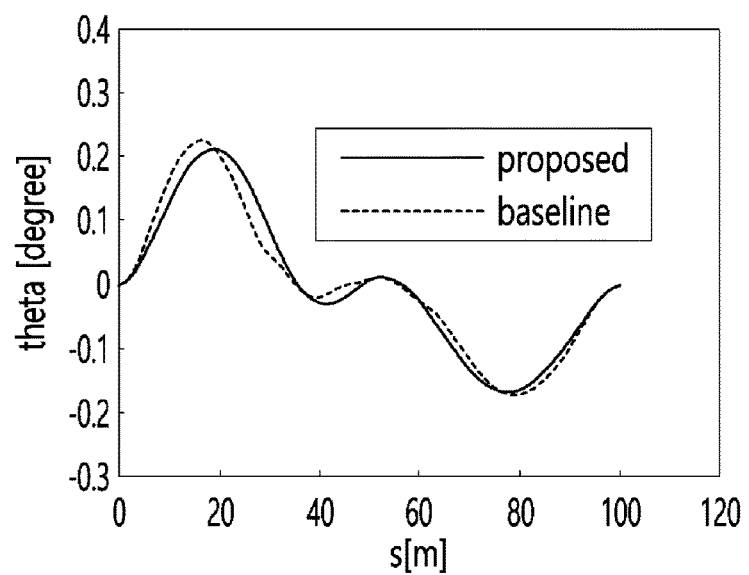
Figure 16C:
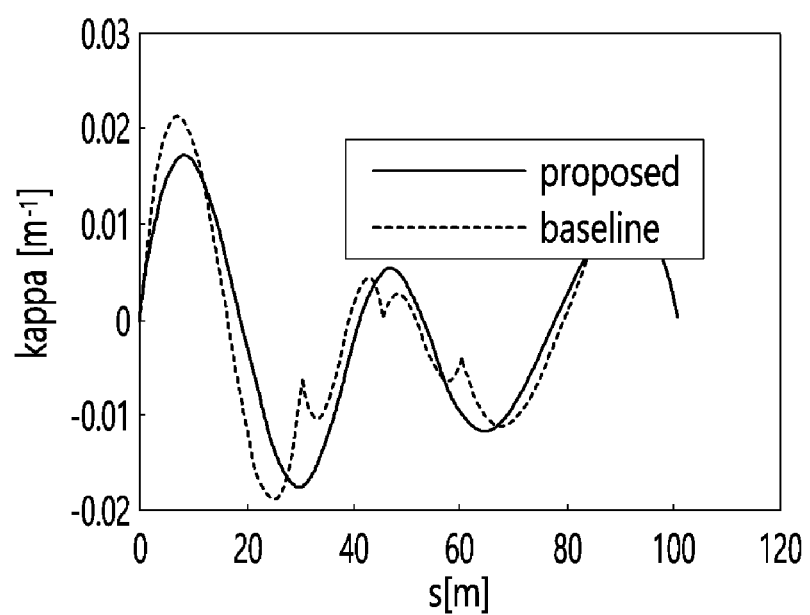

In addition, referring to the graphs of FIGS. 15A- and 16C, a route may be created such that a degree of movement (a variation in a curvature) of the steering wheel is not large as compared to the related art even when the autonomous vehicle 10 changes a predetermined driving route to another driving route (e.g., when several lanes are changed as shown in FIG. 7) or when an avoidance route should be created (e.g., when a predetermined driving route should be returned to after deviation therefrom due to an unexpected situation such as an event as shown in FIG. 8).

That is, unlike a method of creating a driving route by simply connecting points according to the related art, in the method of creating a driving route of an autonomous vehicle according to various embodiments of the present disclosure, a driving route is created by connecting points to satisfy mechanical features, e.g., an angle of movement and an angle of a steering wheel, of the autonomous vehicle 10, so that when the autonomous vehicle 10 travels along the created driving route, the steering wheel may be gradually moved without the sense of difference.

A method of creating a driving route of an autonomous vehicle has been described above, and it will be obvious that a method of controlling driving of an autonomous vehicle using a driving route created according to an embodiment set forth herein is also within the scope of the present disclosure.

According to various embodiments of the present disclosure, a driving route can be created by setting one or more intermediate points between a start point and an end point and connecting the start point, the one or more intermediate points, and the end point, wherein the start point, the one or more intermediate points, and the end point can be connected by taking into consideration an angle of movement and a steering angle (an angle of a steering wheel) of the autonomous vehicle to allow the autonomous vehicle to smoothly travel along the driving route without causing the sense of difference.

Effects of the present disclosure are not limited thereto and other effects described herein will be apparent to those of ordinary skill in the art from the following description.

While embodiments of the present disclosure have been described above with reference to the accompanying drawings, it will be obvious to those of ordinary skill in the art that the present disclosure may be embodied in many different forms without departing from the technical spirit or essential features thereof. Therefore, it should be understood that the embodiments described above are merely examples in all respects and not restrictive.

What is claimed is:

1. A method of creating a driving route of an autonomous vehicle, the method being performed by a computing device, the method comprising:
   obtaining information about a start point and an end point;
   setting an intermediate point between the start point and the end point; and
   creating a driving route by connecting the start point, the set intermediate point, and the end point,
   wherein the driving route comprises a set of a curve connecting the start point and the set intermediate point and a curve connecting the set intermediate point and the end point, is expressed by a polynomial function for an angle of movement of the autonomous vehicle, and satisfies one or more continuity conditions related to a curvature, and wherein the creating of the driving route comprises determining an order of a polynomial function for the created driving route to be 4 when the one or more continuity conditions for the curvature indicate a second continuous derivative of the curvature.

2. The method of claim 1, wherein the set intermediate point comprises a first intermediate point and a second intermediate point, and
the creating of the driving route comprises:
estimating a first polynomial function corresponding to a first unit driving route connecting the start point and the first intermediate point;
estimating a second polynomial function corresponding to a second unit driving route connecting the first intermediate point and the second intermediate point;
estimating a third polynomial function corresponding to a third unit driving route connecting the second intermediate point and the end point;
deciding the estimated first polynomial function, the estimated second polynomial function, and the estimated third polynomial function using the information about the start point, the set intermediate point, and the end point and the one or more continuity conditions related to the curvature; and
creating a final driving route of the autonomous vehicle by connecting the decided first polynomial function, the decided second polynomial function, and the decided third polynomial function.

3. The method of claim 2, wherein the estimating of the first polynomial function corresponding to the first unit driving route comprises:
setting boundary conditions for the start point and the end point; and
estimating the first polynomial function connecting the start point and the first intermediate point, wherein an order of the estimated first polynomial function is determined based on the number of the set boundary conditions.

4. The method of claim 2, wherein the estimating of the first polynomial function corresponding to the first unit driving route comprises:
estimating the first polynomial function connecting the start point and the first intermediate point;
determining a type and number of boundary conditions for the start point and the end point to be set on the basis of an order of the estimated first polynomial function; and
setting the boundary conditions on the basis of the type and number of the determined boundary conditions.

5. The method of claim 2, wherein the estimating of the second polynomial function corresponding to the second unit driving route comprises:
receiving a smoothness of the driving route of the autonomous vehicle;
setting one or more continuity conditions for the curvature on the basis of the received smoothness of the driving route; and
estimating the second polynomial function connecting the first intermediate point and the second intermediate point, wherein an order of the estimated second polynomial function is determined based on the one or more continuity conditions for the curvature.

6. The method of claim 2, wherein the estimating of the third polynomial function corresponding to the third unit driving route comprises:
setting boundary conditions for the start point and the end point; and
estimating the third polynomial function connecting the second intermediate point and the end point, wherein an order of the estimated third polynomial function is determined based on the number of the set boundary conditions.

7. The method of claim 2, wherein the estimating of the third polynomial function corresponding to the third unit driving route comprises:
estimating a third polynomial function connecting the second intermediate point and the end point;
determining a type and number of boundary conditions for the start point and the end point to be set on the basis of an order of the estimated third polynomial function; and
setting the boundary conditions on the basis of the type and number of the determined boundary conditions.

8. The method of claim 1, further comprising:
when the autonomous vehicle traveling along a first driving route is requested to perform a driving route change, resetting one or more intermediate points between the end point and a position of the autonomous vehicle at a point in time when the driving route change is requested;
extracting data about the position of the autonomous vehicle at the point in time when the driving route change is requested from a polynomial function for the first driving route; and
creating a second driving route connecting the position of the autonomous vehicle at the point in time when the driving route change is requested, the reset one or more intermediate points, and the end point on the basis of the extracted data and coordinates of the reset one or more intermediate points.

9. The method of claim 1, further comprising:
when an event occurs on the created driving route and the autonomous vehicle traveling along the created driving route is requested to create an avoidance route with respect to the event, resetting one or more intermediate points between a start point and an end point of the avoidance route, which are located on the created driving route;
extracting data about the start point and the end point of the avoidance route from the polynomial function for the created driving route; and
creating the avoidance route connecting the start point of the avoidance route, the reset one or more intermediate points, and the end point of the avoidance route using the extracted data and coordinates of the reset one or more intermediate points.

10. The method of claim 1, further comprising providing a user interface (UI) configured to output map data of a region, and
wherein the obtaining of the information about the start point and the end point comprises receiving two-dimensional (2D) coordinates of the start point and the end point and angles of movement of the autonomous vehicle at the start point and the end point through the UI,
the setting of the intermediate point comprises receiving 2D coordinates of one or more intermediate points between the start point and the end point through the UI, and
the creating of the driving route comprises:
creating the driving route connecting the start point, the one or more intermediate points, and the end point received through the UI, and automatically updating the created driving route to include a new intermediate point when the new intermediate point is additionally received through the UI; and displaying the created driving route on map data output through the UI.

11. The method of claim 1, further comprising obtaining map data about the region including the start point and the end, and wherein the setting of the intermediate point comprises:

analyzing the map data about the region to identify lanes of a road connecting the start point and the end point; and selecting one or more intermediate points between the start point and the end point on the basis of a result of identifying the lanes of the road.

12. An apparatus for creating a driving route of an autonomous vehicle, comprising:

a processor;

a network interface;

a memory; and a computer program loaded in the memory and executed by the processor, wherein the computer program comprises:

an instruction to obtain information about a start point and an end point;

an instruction to set an intermediate point between the start point and the end point; and an instruction to create a driving route connecting the start point, the intermediate point, and the end point, wherein the driving route comprises a set of a curve connecting the start point and the intermediate point and a curve connecting the intermediate point and the end point, is expressed using a polynomial function for an angle of movement of the autonomous vehicle, and satisfies one or more continuity conditions related to a curvature, and wherein the instruction to create the driving route comprises an instruction to determine an order of a polynomial function for the created driving route to be 4 when the one or more continuity conditions for the curvature indicate a second continuous derivative of the curvature.

13. A computer program recorded on a computer-readable recording medium, which is executed to perform, when combined with a computing device:

obtaining information about a start point and an end point;

setting an intermediate point between the start point and the end point; and creating a driving route connecting the start point, the intermediate point, and the end point, wherein the created driving route comprises a set of a curve connecting the start point and the set intermediate point and a curve connecting the set intermediate point and the end point, is expressed using a polynomial function for an angle of movement of an autonomous vehicle, and satisfies one or more continuity conditions for a curvature, and wherein the creating of the driving route comprises determining an order of a polynomial function for the created driving route to be 4 when the one or more continuity conditions for the curvature indicate a second continuous derivative of the curvature.

* * * * *